US008595436B2

(12) United States Patent
Satoyama et al.

(10) Patent No.: US 8,595,436 B2
(45) Date of Patent: *Nov. 26, 2013

(54) VIRTUAL STORAGE SYSTEM AND CONTROL METHOD THEREOF

(75) Inventors: Ai Satoyama, Sagamihara (JP); Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/398,924

(22) Filed: Feb. 17, 2012

(65) Prior Publication Data

US 2012/0151160 A1   Jun. 14, 2012

Related U.S. Application Data

(63) Continuation of application No. 12/732,304, filed on Mar. 26, 2010, now Pat. No. 8,161,239, which is a continuation of application No. 11/389,128, filed on Mar. 27, 2006, now Pat. No. 7,711,908.

(30) Foreign Application Priority Data

Feb. 13, 2006   (JP) ................................. 2006-034882

(51) Int. Cl.
   *G06F 12/00*   (2006.01)
   *G06F 13/00*   (2006.01)
   *G06F 13/28*   (2006.01)

(52) U.S. Cl.
   USPC .................... 711/114; 711/154; 711/E12.001

(58) Field of Classification Search
   USPC .................... 711/114, 154, E12.001
   See application file for complete search history.

(56) References Cited

U.S. PATENT DOCUMENTS

| 5,454,102 | A | 9/1995 | Tang et al. |
| 5,619,690 | A | 4/1997 | Matsumani et al. |
| 6,457,098 | B1 | 9/2002 | DeKoning et al. |
| 7,162,575 | B2 * | 1/2007 | Dalal et al. ................... 711/112 |
| 7,191,198 | B2 * | 3/2007 | Asano et al. .......................... 1/1 |
| 7,243,229 | B2 * | 7/2007 | Maki et al. ................... 713/164 |
| 7,287,116 | B2 * | 10/2007 | Iwami et al. ...................... 711/6 |
| 7,487,308 | B1 | 2/2009 | Dalal et al. |

(Continued)

FOREIGN PATENT DOCUMENTS

| EP | 1 357 465 | 10/2003 |
| EP | 1517230 | 3/2005 |

(Continued)

OTHER PUBLICATIONS

Extended European Search Report in Appln. No. 06253133.0-1245/1821186 (8 pages).

*Primary Examiner* — Sheng-Jen Tsai
(74) *Attorney, Agent, or Firm* — Antonelli, Terry, Stout & Krause, LLP.

(57) ABSTRACT

A virtual storage system is equipped with a plurality of storage systems and a virtualization device for virtualizing the plurality of storage systems logically into a single storage resource provided to a host computer. When one of the storage systems receives a command from the host computer, in the event that the storage system itself is not in possession of a function corresponding to the command, the storage system retrieves a storage system in possession of a function corresponding to the command and transfers this command to the storage system in possession of the function corresponding to the command.

20 Claims, 18 Drawing Sheets

(56) References Cited

U.S. PATENT DOCUMENTS

| | | |
|---|---|---|
| 7,711,908 B2 | 5/2010 | Satoyama et al. |
| 7,801,998 B2 | 9/2010 | Mazzagatte et al. |
| 7,917,805 B2 | 3/2011 | Ninose et al. |
| 2002/0065913 A1 | 5/2002 | Harrington |
| 2003/0158980 A1 | 8/2003 | Mizuno |
| 2003/0188045 A1 | 10/2003 | Jacobson |
| 2003/0204597 A1* | 10/2003 | Arakawa et al. ............. 709/226 |
| 2004/0059735 A1 | 3/2004 | Gold et al. |
| 2004/0103254 A1 | 5/2004 | Satoyama et al. |
| 2004/0151188 A1 | 8/2004 | Maveli et al. |
| 2004/0215749 A1* | 10/2004 | Tsao ............................ 709/220 |
| 2005/0005033 A1 | 1/2005 | Powell et al. |
| 2005/0060506 A1 | 3/2005 | Higaki et al. |
| 2005/0193167 A1 | 9/2005 | Eguchi et al. |
| 2005/0204105 A1 | 9/2005 | Kawamura et al. |
| 2005/0210098 A1 | 9/2005 | Nakamichi et al. |
| 2005/0216661 A1 | 9/2005 | Kano |
| 2005/0216777 A1 | 9/2005 | Suzuki et al. |
| 2005/0262296 A1* | 11/2005 | Peake ........................... 711/111 |
| 2006/0010341 A1 | 1/2006 | Kodama |
| 2006/0123062 A1 | 6/2006 | Bobbitt et al. |
| 2006/0195669 A1 | 8/2006 | Higaki et al. |
| 2006/0195676 A1 | 8/2006 | Honda et al. |
| 2007/0011226 A1 | 1/2007 | Hinni et al. |
| 2007/0067593 A1 | 3/2007 | Satoyama et al. |
| 2009/0199041 A1* | 8/2009 | Fukui et al. ....................... 714/6 |
| 2011/0208940 A1 | 8/2011 | Naganuma et al. |

FOREIGN PATENT DOCUMENTS

| | | |
|---|---|---|
| JP | 07-210439 | 8/1995 |
| JP | 09-297660 | 11/1997 |
| JP | 2000-112666 | 4/2000 |
| JP | 2001-318833 | 11/2001 |
| JP | 2001-318904 | 11/2001 |
| JP | 2003-242097 | 8/2003 |
| JP | 2004-126972 | 4/2004 |
| JP | 2004-220450 | 8/2004 |
| JP | 2004-227558 | 8/2004 |
| JP | 2005-92424 | 4/2005 |
| JP | 2005-107645 | 4/2005 |
| JP | 2005-258850 | 9/2005 |
| WO | WO 2005/099201 | 10/2005 |

* cited by examiner

SAME DEVICE CORRESPONDENCE TABLE    62

| PATH NUMBER | STORAGE SYSTEM IDENTIFIER | LUN | DEVICE IDENTIFIER |
|---|---|---|---|
| 0 | HA | 10 | a |
| 1 | HA | 11 | b |
| 2 | HA | 10 | a |
| 3 | HB | 9 | a |

FIG.4

COMMAND - FUNCTION CORRESPONDENCE TABLE 104

| COMMAND | FUNCTION |
|---------|----------|
| C001 | A |
| C002 | A |
| C003 | A |
| C004 | B |

FIG.5

FUNCTION - DEVICE CORRESPONDENCE TABLE 105

| FUNCTION | STORAGE SYSTEM |
|----------|----------------|
| B | 20A |
| B | 20B |
| A | 20C |

FIG.8

DEVICE INFORMATION TABLE 106

| DEVICE NUMBER | STATUS FLAG | EXTERNAL DEVICE FLAG |
|---|---|---|
| 0 | ON | OFF |
| 1 | ON | OFF |
| 2 | ON | OFF |
| 3 | ON | ON |

FIG.9

FAULT INFORMATION 107

| STORAGE SYSTEM | STATUS |
|---|---|
| 20A | NORMAL |
| 20B | NORMAL |
| 20C | FAULT |

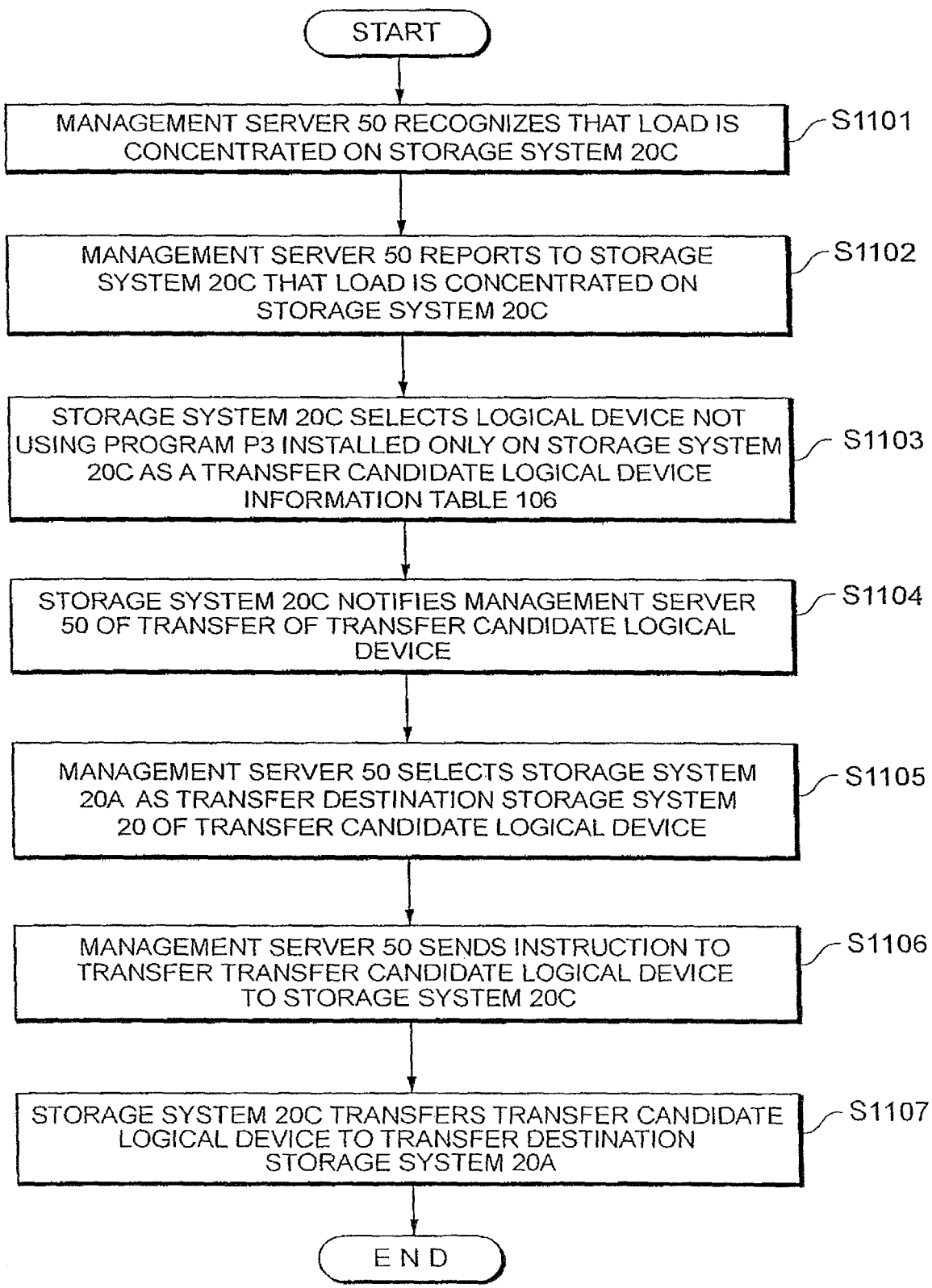

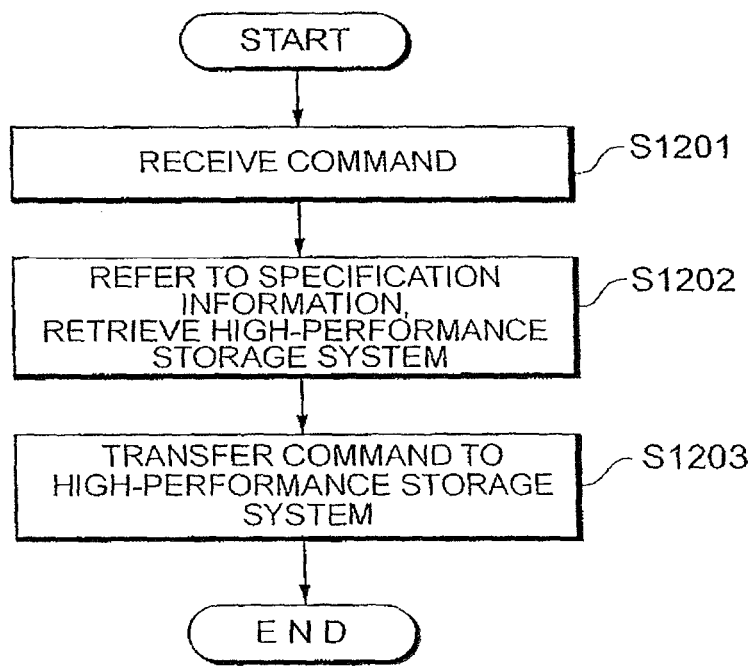

FIG.23

RATE OF OPERATION INFORMATION 110

| STORAGE SYSTEM | RATE OF OPERATION |
|---|---|
| 20A | * * * * |
| 20B | * * * * |
| 20C | * * * * |

FIG.24

START
↓
RECEIVE COMMAND — S1301
↓
REFER TO RATE OF OPERATION INFORMATION, RETRIEVE LOW RATE OF OPERATION STORAGE SYSTEM — S1302
↓
TRANSFER COMMAND TO LOW RATE OF OPERATION STORAGE SYSTEM — S1303
↓
END

VIRTUAL STORAGE SYSTEM AND CONTROL METHOD THEREOF

CROSS-REFERENCES TO RELATED APPLICATIONS

This application is a continuation of application Ser. No. 12/732,304, filed Mar. 26, 2010, now U.S. Pat. No. 8,161,239 which, in turn, is a continuation of application Ser. No. 11/389,128, filed Mar. 27, 2006 (now U.S. Pat. No. 7,711, 908); and which application relates to and claims priority from Japanese Patent Application No. 2006-34882, filed on Feb. 13, 2006, the entire disclosures of which are incorporated herein by reference.

BACKGROUND

The present invention relates to a virtual storage system and control method thereof for virtualizing a plurality of storage systems logically as a single storage resource.

In the storage field, notice is being taken of "storage grids (wide area wide band shared file systems)" capable of achieving high processing performance and fault tolerance that operate in such a manner that a plurality of computing resources distributed over a network operate as a single computing resource. A method of virtualizing a plurality of storage systems logically as a single virtual storage resource is well-known as a storage grid operation method.

Technology where a logical unit of a second storage system existing outside of a first storage system is managed within the first storage system is well-known as technology for virtualizing a volume (refer to Japanese Patent Laid-open Publication No. Hei. 7-210439, Japanese Patent Laid-open Publication No. 2001-318833, or Japanese Patent Laid-open Publication No. 2004-220450).

SUMMARY

At a storage grid, when a storage system having function B of a plurality of storage systems logically constituting a single storage resource receives a processing request for function B from a host computer, this storage system is capable of recognizing the process request for function B and carrying out processing.

However, the respective storage systems that are virtualized logically as a single storage resource by the storage grid are not limited to having to share functions. For example, there are also cases where only some of the storage systems of the plurality of storage systems constituting the storage grid have function A. The host computer recognizes the plurality of storage systems as a single storage resource. There are therefore cases where process requests for function A are sent to storage systems that do not have function A. In such cases, a command error is sent back to the host computer, and process requests for the function A are not processed appropriately.

The present invention therefore deals with the problem of processing commands from a host computer in an appropriate manner even in cases where the functions in the possession of each storage system are different in a virtual storage system virtualizing a plurality of storage systems as a single storage resource.

In order to resolve the aforementioned problems, a virtual storage system of the present invention having a plurality of storage systems and a virtualization layer for virtualizing the plurality of storage systems logically into a single storage resource provided to a host computer comprises a storage section for storing a corresponding relationship between commands issued by the host computer, functions corresponding to the commands, and storage systems in possession of the functions, a retrieval section for retrieving storage systems in possession of functions corresponding to the commands from the plurality of storage systems and a transfer section for transferring the commands to the storage systems in possession of the functions corresponding to the commands.

According to the present invention, it is possible to process commands from a host computer in an appropriate manner even in cases where the functions in the possession of each storage system are different in virtual storage systems virtualizing a plurality of storage systems as a single storage resource.

DESCRIPTION OF THE DRAWINGS

FIG. 4 is a view illustrating a command-function correspondence table.

FIG. 5 is a view illustrating a function-device correspondence table.

FIG. 8 is a view illustrating a device information table.

FIG. 9 is a view illustrating fault information.

FIG. 20 is a flowchart showing a load distribution process for a virtual storage system.

FIG. 21 is a view illustrating specification information.

FIG. 22 is a flowchart showing a command process taking into consideration differences in performance of each storage system.

FIG. 23 is a view illustrating rate of operation information.

FIG. 24 is a flowchart showing a command process taking into consideration differences in rate of operation of each storage system.

DETAILED DESCRIPTION

Figure 1:
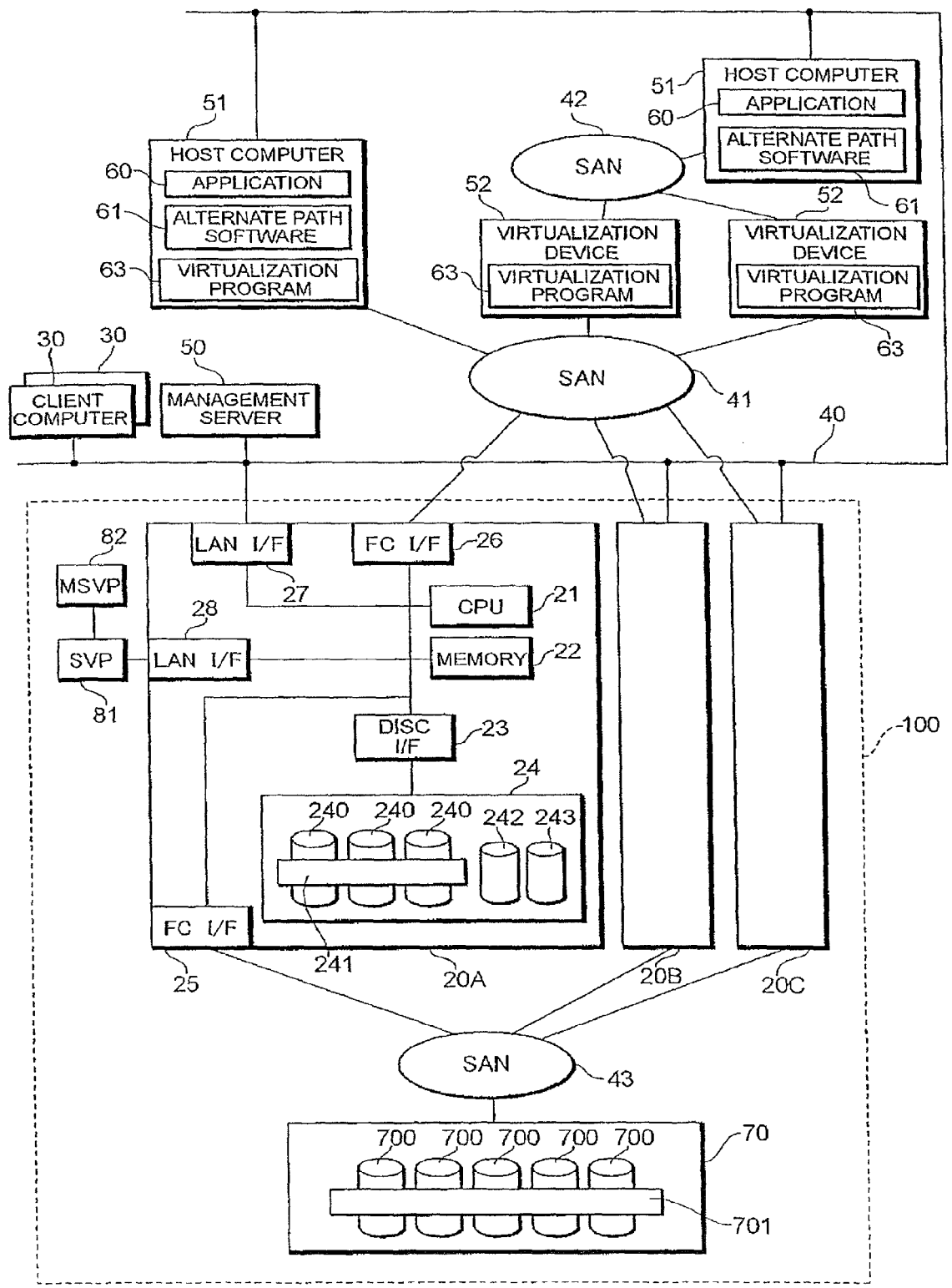
FIG. 1 is a system configuration view of a virtual storage system of this embodiment.

FIG. 1 shows a system configuration of a virtual storage system 100 of an embodiment. The virtual storage system 100 is equipped with a plurality of storage systems 20A, 20B, 20C, and an external storage system 70.

One or more host computers 51 are connected to the storage systems 20A, 20B, 20C, respectively. A host computer 51 having a virtualization program 63 is connected to the storage systems 20A, 20B, 20C via a SAN (Storage Area Network) 41 and recognizes the plurality of storage systems 20A, 20B, 20C logically as a single storage resource (hereinafter referred to as virtual storage system 100) due to the function of the virtualization program 63.

Another host computer 51 that does not have a virtualization program 63 is connected to the storage systems 20A, 20B, 20C via SAN 42, a virtualization device 52, and SAN 41 and recognizes the plurality of storage systems 20A, 20B, 20C as a single virtual storage system 100 using a function of the virtualization program 63 within the virtualization device 52.

From the above configuration, the host computer 51 recognizes storage regions provided by the plurality of storage systems 20A, 20B, 20C logically as a single virtual storage system 100 and is capable of accessing the virtual storage system 100.

The virtualization device 52 virtualizes the storage regions provided respectively by the plurality of storage systems 20A, 20B, 20C logically into a single storage region. The virtualization device 52 may be, for example, a virtualization switch, an intelligent switch, or a virtualization-dedicated device, etc. A system configured so as to include the virtual storage system 100 and the virtualization device 52 is referred to as a storage network system.

The host computer 51 is comprised of an application program 60 and alternate path software 61.

The application program 60 is, for example, a service program such as, for example, database management software, Web application software, streaming application software, and E-business application software, etc.

The alternate path software 61 manages logical paths between the host computer 51 and logical devices within the virtual storage system 100 and executes multipath control. Multipath control refers to controlling of which logical path of a plurality of logical paths is used to access a logical device. The alternate path software 61 is comprised of a multipath management program (not shown), an inter-casing multipath program (not shown), a priority control program (not shown), and a same device correspondence table 62.

The multipath management program carries out management and control of the whole of the alternate path software 61.

The inter-casing multipath program recognizes a plurality of logical paths connected to a logical device 701 within an external storage system 70 via a plurality of storage systems 20 as a multipath.

The priority control program selects logical paths to be given priority for use from a plurality of logical paths based on the respective usage rates of a plurality of logical paths connected to the same logical device.

The same device correspondence table 62 shows the corresponding relationship between logical paths and logical devices in a network environment where different logical paths are connected to the same logical device.

It is not essential for the alternate path software 61 to be stored within the host computer 51 and this may also be stored within the virtualization device 52.

In the description below, the storage systems 20A, 20B, 20C are referred to as "storage system 20" when there is no particular need for discrimination.

The storage system 20 is comprised of a CPU (Central Processing Unit) 21, memory 22, a disc interface control section 23, a disc unit 24, FC (Fiber Channel) interface control sections 25, 26, and LAN (Local Area Network) interface control sections 27, 28.

The CPU 21 executes each of the various control processes occurring at the storage system 20 by executing each of the various programs and modules stored in the memory 22. The memory 22 is referred to as an internal storage device, and is comprised of non-volatile memory for storing each of the various modules etc., and volatile memory for temporarily holding computation processing results of the CPU 21.

The CPU 21 is connected to the disc unit 24 via the disc interface control section 23. The disc interface control section 23 converts logical addresses outputted by the CPU 21 to LBA (Logical Block Addresses) and is capable of accessing a logical device using the CPU 21.

The disc unit 24 has a plurality of disc drives 240 constituting a RAID (Redundant Arrays of Independent Inexpensive Disks).

The disc drives 240 are physical devices such as an FC (Fibre Channel) disc drive, a SATA (Serial Advanced Technology Attachment) disc drive, a PATA (Parallel Advanced Technology Attachment) disc drive, a FATA(Fibre Attached Technology Adapted) disc drive, an SAS (Serial Attached SCSI) disc drive, or an SCSI(Small Computer System Interface)disc drive, etc. A physical device is a real device having a real storage region.

A logical device 242 is a virtual storage device that does not have a real storage region, with a real storage region storing the data existing in the logical device 701 within the external storage system 70. Namely, the storage system 20 incorporates the logical device 701 of the external storage system 70 as its own internal device and supplies this as a logical unit to the host computer 51. In the event that the host computer 51 is a UNIX (registered trade mark) family system, the logical unit correlates to a device file (Device File). In the event that the host computer 51 is a Windows (registered trade mark) family system, the logical unit correlates to a drive letter (Drive Name). A LUN (Logical Unit Number) is assigned to a logical unit. The details of the method for virtualizing the logical device 701 of the external storage system 70 so as to be handled as an internal device of the storage system 20 are disclosed in Japanese Patent Laid-open Publication No. 2005-107645.

The command device 243 is a dedicated logical unit for handing over commands and statuses between the host computer 51 and the storage system 20. Commands sent from the host computer 51 to the storage system 20 are written to the command device 243. The storage system 20 executes processes corresponding to commands written to the command device 243 and writes the results of execution to the command device 243 as statuses. The details of the command management using the command device 243 are described in the following.

The disc interface control section 23 is capable of controlling the plurality of disc drives 240 using RAID levels (for example, 0, 1, 5) defined by the RAID system. The RAID system manages a plurality of disc drives 240 as a single RAID group. A RAID group is configured from, for example, four disc drives 240 grouped together into one set (3D+1P), or eight disc drives 240 grouped together into one set (7D+1P). Namely, the storage regions respectively provided by the plurality of disc drives 240 are gathered together to make up a single RAID group. A plurality of logical devices 241 constituting access units from the host computer 51 are defined on a RAID group. One or more logical devices 241 are then mapped on a logical unit constituted by a logical storage region recognized by the host computer 51. The host computer 51 is capable of accessing the logical device 241 by designating LUN and LBA.

It is by no means essential to provide the disc unit 24 and the disc interface control section 23 providing that the storage system 20 can provide storage regions of the external storage system 70 to the host computer 51 by connecting to the external storage system 70.

The FC interface control section 25 controls transfer of commands and data via SAN 43 between the storage system 20 and the external storage system 70. The FC interface control section 26 controls transfer of commands and data via SAN 41 between the storage system 20 and the host computer 51. The data communication for via the SAN 41 and 43 is a fiber channel protocol or iSCSI protocol, etc. SAN 43 is not essential, and the FC interface control section 25 and external storage system 70 may also be directly connected by optical fiber cable etc.

The LAN interface control section 27 is connected to a management server 50 via a management network 40. The management network 40 is a LAN configured from Ethernet cable, etc. The data communication protocol for the management network 40 is TCP/IP. The management server 50 manages the production of logical units within the virtual storage system 100, the allocation of logical units to the host computer 51, and the setting (LUN masking, zoning, etc.) of access paths between the host computer 51 and the virtual storage system 100.

The external storage system 70 has one or more disc drives 700 in a RAID configuration. The disc drive 700 is a storage device such as an FC (Fibre Channel) disc drive, a SATA (Serial Advanced Technology Attachment) disc drive, a PATA (Parallel Advanced Technology Attachment) disc drive, a FATA (Fibre Attached Technology Adapted) disc drive, an SAS (Serial Attached SCSI) disc drive, or an SCSI (Small Computer System Interface) disc drive, etc. A logical device 701 is formed on the plurality of disc drives 700.

The external storage system 70 may be a different type of storage system as the storage system 20 or may be the same type of storage system.

When an access request is received from the host computer 51, the storage system 20 determines whether this access request is an access request to logical device 241 taken as its own internal device or an access request to logical device 701 taken as an external device. If this is an access request to the logical device 701, address conversion is carried out for between the logical device 242 and the logical device 701 and an access request to the logical device 701 is sent to the external storage system 70.

The service processor 81 is a computer terminal for setting configuration information (including a device information table 106 and configuration information 108 described later) of the storage system 20 and acquiring operation information etc. The service processor 81 is connected to the LAN interface control section 28 within the storage system 20. Each service processor 81 connected to each storage system 20 is connected to one master service processor 82. The master service processor 82 uniformly manages information (configuration information, operation information etc. for the storage system 20) collected from each of the service processors 81. One of the plurality of service processors 81 may function as the master service processor, or each storage system 20 may be directly connected to the master service processor 82.

The virtual storage system 100 exhibits a range where transfer of commands and execution of volume migration between each of the storage systems 20 is possible by transmitting and receiving configuration information between each of the storage systems 20. In the event that the external storage system 70 is connected to each storage system 20, the range of the virtual storage system 100 includes the plurality of storage systems 20 and the external storage system 70. In the event that the external storage system 70 is not connected to each storage system 20, the range of the virtual storage system 100 includes the plurality of storage systems 20 but does not include the external storage system 70.

Each storage system 20 is capable of being configured as a disc array system provided with a plurality of disc drives 240 in, for example, a RAID configuration, or is capable of being configured as a virtual switch where each storage system 20 itself constitutes a SCSI target. A storage system 20 may also be referred to as a storage control device.

The management network 40 is connected to one or more host computers 51. Further, one or more client computers 30 are connected to the management network 40. Each client computer 51 is connected to a host computer 51 via the management network 40 and is capable of requesting input and output of data to the virtual storage system 100 via the application program 60.

Figures 2, 3:
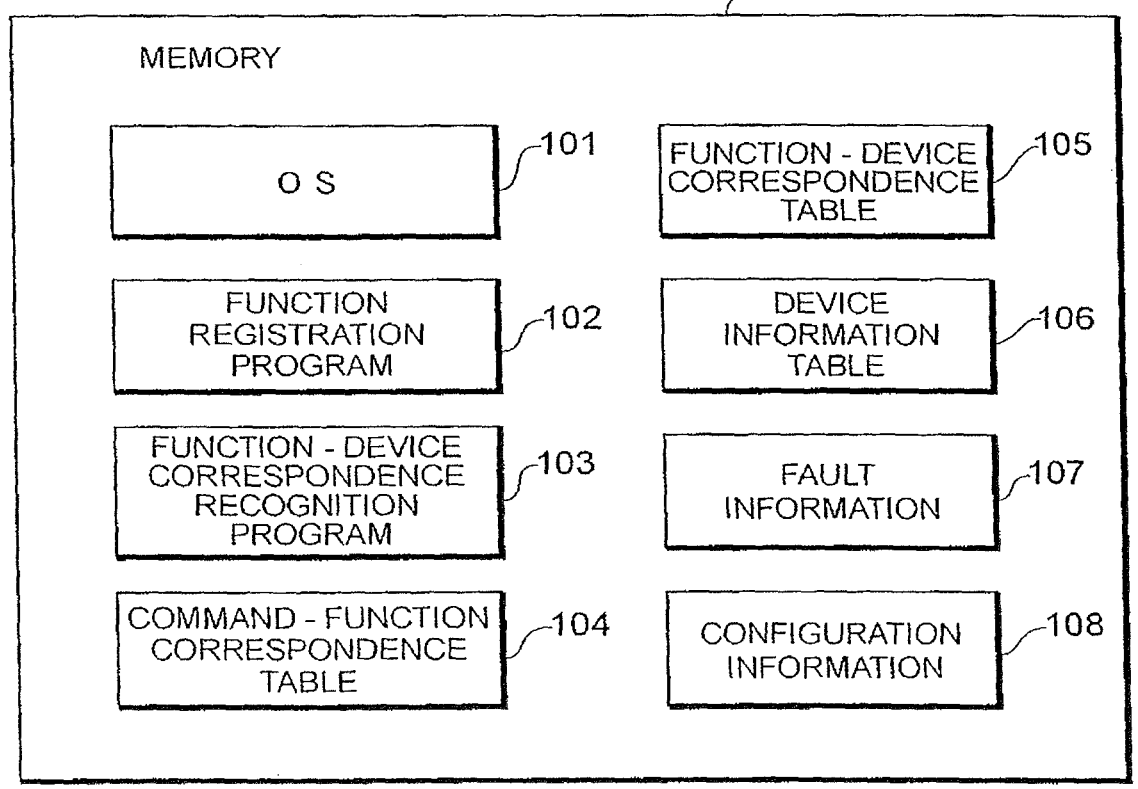
FIG. 2 is a view illustrating a same device correspondence table.
FIG. 3 is a view illustrating each of the various programs and tables stored in the storage system.

FIG. 2 shows a same device correspondence table 62. The same device correspondence table 62 stores a "path number", "storage system identifier", "LUN", and "device identifier" in a correlating manner.

"Path number" indicates the number of a logical path.

"Storage system identifier" indicates information for uniquely identifying a storage system 20 or external storage system 70 within the virtual storage system 100.

"LUN" indicates a logical unit number for within the storage system 20 or the external storage system 70.

"Device identifier" indicates information for uniquely identifying logical devices 241, 242, 701 within the virtual storage system 100.

Three logical paths of path numbers 0, 2, 3 pass through different storage systems 20 but are shown to be connected to the same logical device. LUN is different every storage system 20 even for the same logical device because a host storage domain is adopted.

The same device correspondence table 62 holds a virtualization layer (in the example shown in FIG. 1, host computer 51 or virtualization device 52) virtualizing the plurality of storage systems 20 into a single virtual storage system 100.

FIG. 3 shows the various programs and tables stored in the memory 22. An operating system 101, function registration program 102, function-device correspondence recognition program 103, command-function correspondence table 104, function-device correspondence table 105, device information table 106, fault information 107, and configuration information 108 are stored in the memory 22.

The command-function correspondence table 104 holds a correspondence relationship between commands issued by the host computer 51 and functions corresponding to these commands. For example, snapshots, replications, and remote copies exist as specific examples of "functions" requested by the host computer 51 to the virtual storage system 100.

The function registration program 102 registers command and function correspondence information in a command-function correspondence table 104.

The function-device correspondence table 105 holds a correspondence relationship for functions required by the host computer 51 and storage systems 20 in possession of these functions.

The function-device correspondence recognition program 103 registers a correspondence relationship between the storage systems 20 and the functions in the function-device correspondence table 105.

The device information table 106 holds attributes of logical devices.

The fault information 107 holds fault information for each storage system 20.

The configuration information 108 is mapping information indicating a corresponding relationship between the physical device 701 within the external storage system 70 and the logical devices 242 within each storage system 20. The details of mapping information for mapping the external device at the internal devices is disclosed in Japanese Patent Laid-open Publication No. 2005-107645.

In command management described in the following, it is by no means essential for the virtual storage system 100 to hold a corresponding relationship for the commands, functions, and storage systems 20 in the table format described above providing that which function a command issued by the host computer 51 corresponds to and which storage system 20 has this function can be retrieved, and it is possible for this command to be transferred to the retrieved storage system 20. For example, the corresponding relationship for the commands, functions and storage system 20 can be held as a list structure or other format.

FIG. 4 shows the command-function correspondence table 104. The command-function correspondence table 104 holds a correspondence relationship between commands issued from the host computer 51 to the virtual storage system 100 and functions corresponding to these commands. For example, command C001 is a command for calling function A at the virtual storage system 100.

FIG. 5 shows a function-device correspondence table 105. The function-device correspondence table 105 holds a correspondence relationship for functions required by the host computer 51 and storage systems 20 in possession of these functions. For example, storage system 20A has function B.

Figure 6:
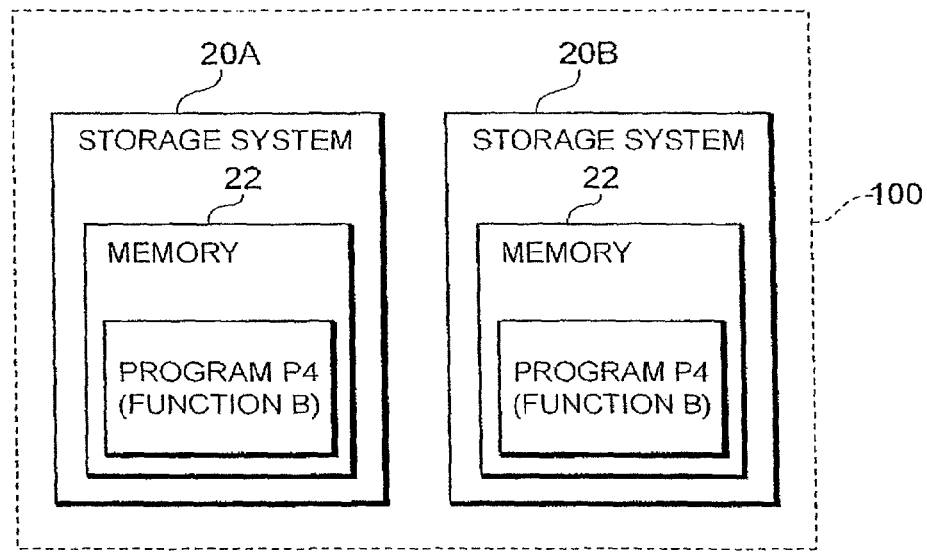
FIG. 6 is a view illustrating a function possessed by a storage system.
Figure 7:
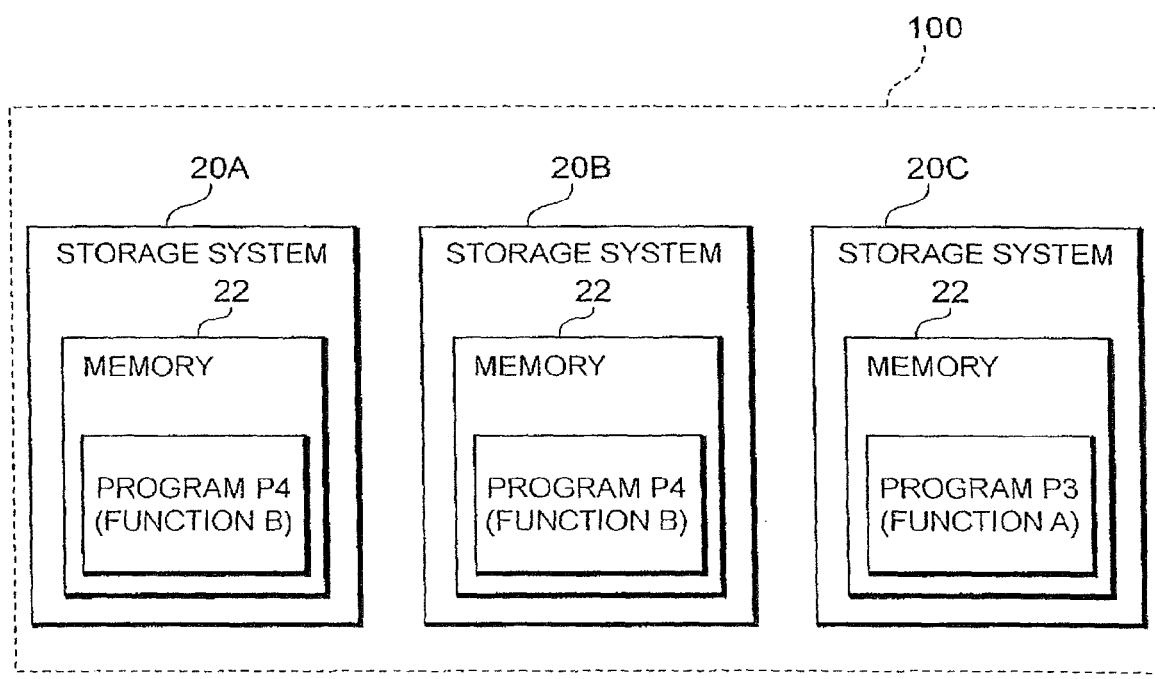
FIG. 7 is a further view illustrating a function possessed by a storage system.

As shown in FIG. 6, for example, in the event that the virtual storage system 100 is configured from storage system 20A and storage system 20B, storage system 20A and function B, and storage system 20B and function B are registered in a respectively correlating manner in the function-device correspondence table 105, and command C004 and function B are registered in a correlating manner in the command-function correspondence table 104. Program P4 is for implementing function B. As shown in FIG. 7, when a storage system 20C is newly added to the virtual storage system 100, storage system 20C and function A are added so as to be registered in a correlating manner at the function-device correspondence table 105, and commands C001, C002, C003 and function A are added so as to be registered in a correlating manner to the command function correspondence table 104. Program P3 is for implementing function A.

The following variations in (1) to (6) can be considered as ways for the virtual storage system 100 to hold the command-function correspondence table 104 and the function-device correspondence table 105.

(1) The memory 22 within the storage system 20 and the management server 50 are respectively held in the command-function correspondence table 104 and the function-device correspondence table 105.

(2) The management server 50 holds the command-function correspondence table 104 and the function-device correspondence table 105.

(3) The host computer 51 holds the command-function correspondence table 104 and the function-device correspondence table 105.

(4) A virtualization layer virtualizing a plurality of storage systems 20 into a single virtual storage system 100 is held in command-function correspondence table 104 and function-device correspondence table 105.

(5) The service processor 81 and master service processor 82 are held in command-function correspondence table 104 and function-device correspondence table 105.

(6) The command device 243 holds the command-function correspondence table 104 and the function-device correspondence table 105.

FIG. 8 shows the device information table 106. The device information table 106 is for holding attributes of logical devices and is stored in the memory 22 within the storage system 20. The device information table 106 stores a "device number", "status flag", and "external device flag" in a correlating manner.

"Device number" is information for uniquely identifying logical devices 241, 242 within a storage system 20.

"Status flag" indicates whether the logical devices 241, 242 within the storage system 20 are used or not used (empty). "ON" in the drawing indicates that the logical devices 241 and 242 are being used.

"External device flag" indicates whether or not the logical device 242 within the storage system 20 is being used as an external device (logical device 701). "ON" in the drawing indicates that the logical device 242 is being used as an external device. "OFF" in the drawing indicates that the logical device 241 is being used as an internal device. The default value of the external device flag is "OFF", and "OFF" is changed to "ON" when the logical device 242 within the storage system 20 is mapped to the logical device 701 within the external storage system 70.

FIG. 9 shows fault information 107. Fault information 107 is information indicating whether or not each storage system 20 is functioning normally or has a fault. In this embodiment, an example is shown where it is determined that a fault is occurring at a storage system 20 in the event that the storage system is in a state where commands from the host computer 51 cannot be received, but it is also possible to determine whether or not a fault is occurring at a storage system 20 based on a preset fault level. The fault level used in fault determination may be inputted by the user, or may be a fault level selected by a user from a plurality of fault levels designated by a user. Each memory 22 of each storage system 20 and the management server 50 hold the fault information 107.

Figure 10:
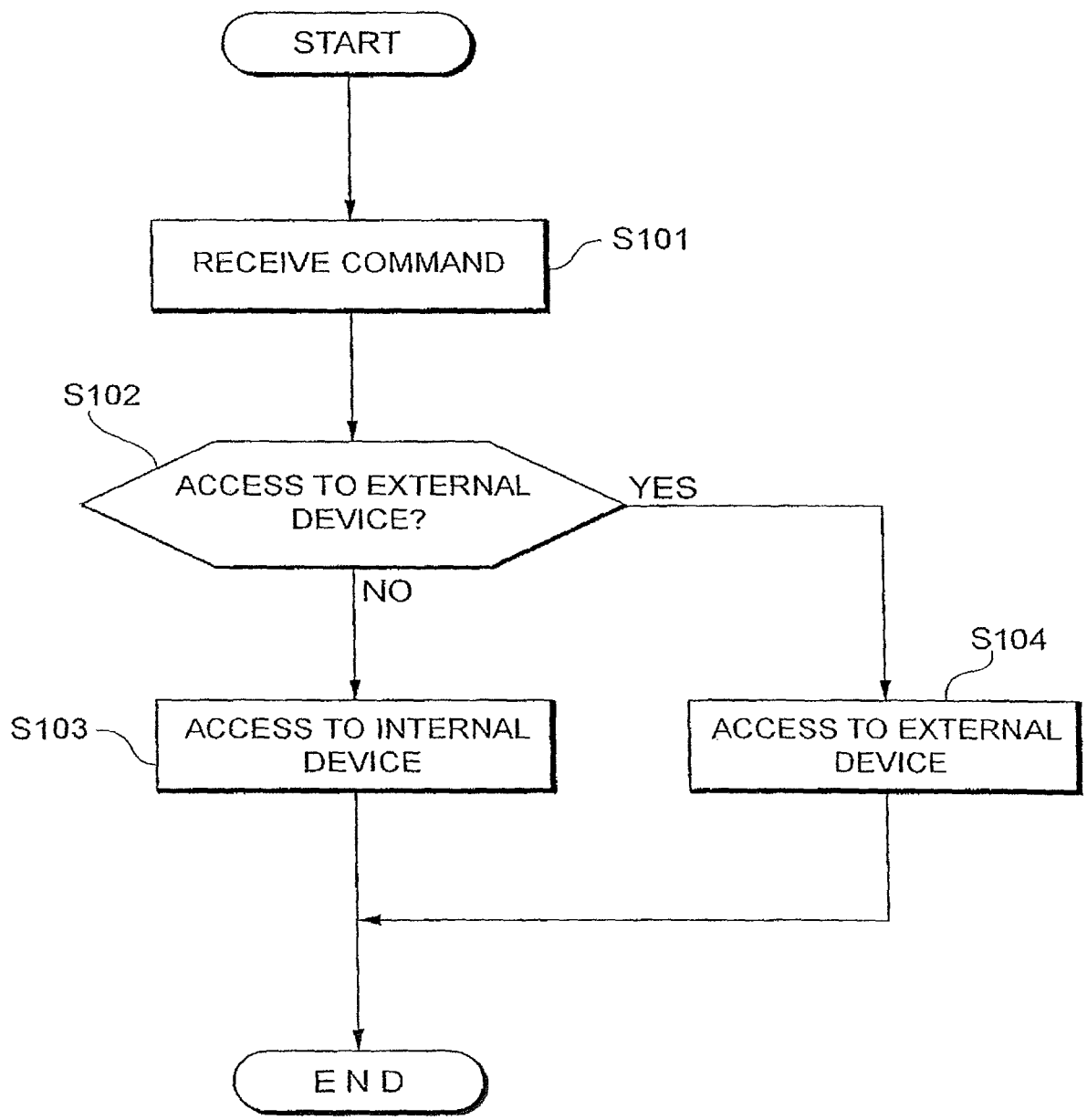
FIG. 10 is a flowchart showing a typical command process.

Typical command processes executed by the storage system 20 are described with reference to FIG. 10.

When a command is received from the host computer 51 (S101), the storage system 20 determines whether or not the logical device receiving the access request is an external device (logical device 701) by referring to device information table 106 (S102).

If the logical device receiving the access request is an internal device (logical device 241) (S102: NO), the storage system 20 accesses the internal device using normal operations (S103).

If the logical device receiving the access request is an external device (logical device 701) (S102: YES), the storage device 20 sends a command for accessing the external device to the external storage system 70 (S104).

Figure 11:
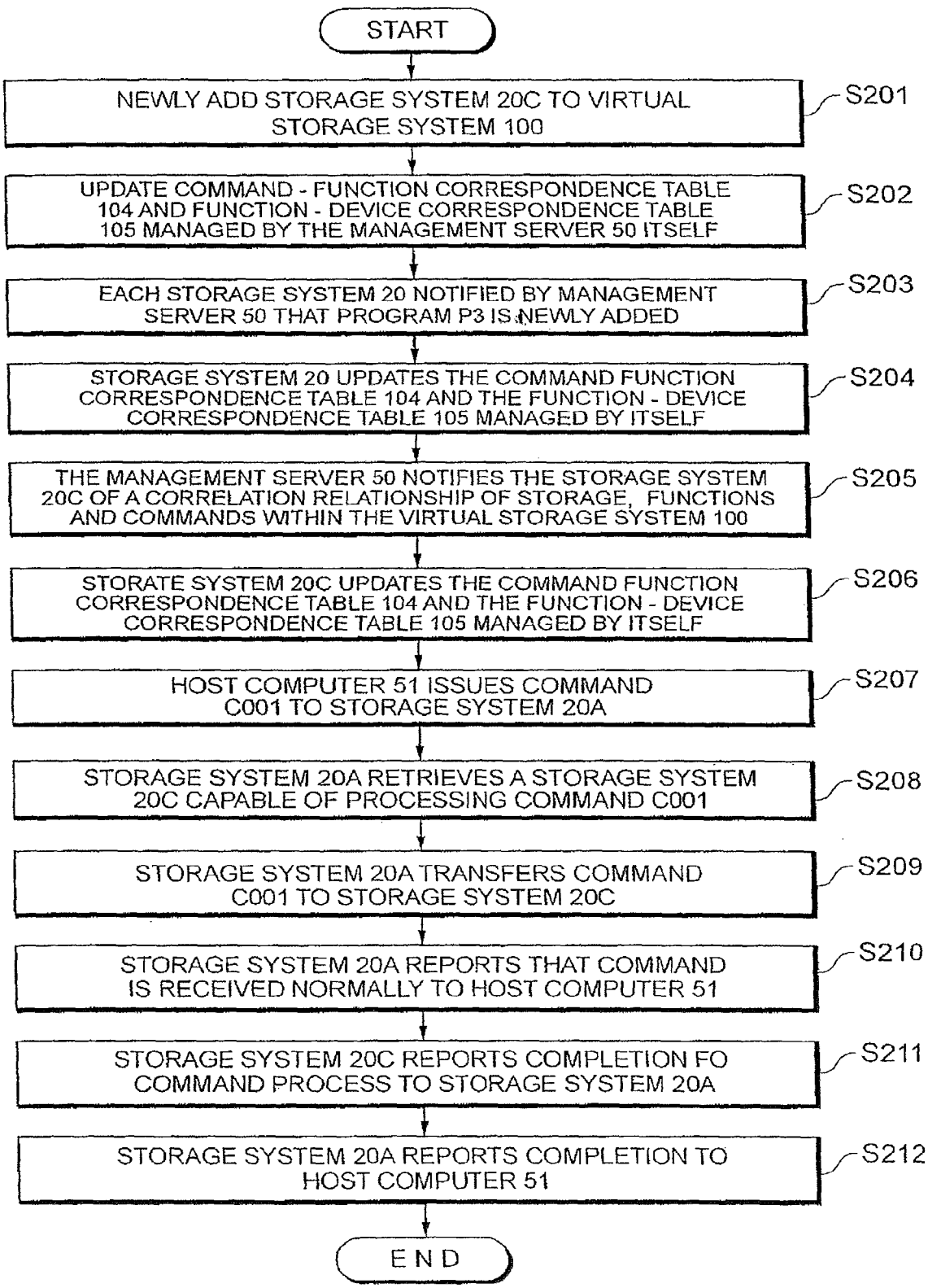
FIG. 11 is a flowchart showing command management executed by a virtual storage system.

Next, a description is given with reference to FIG. 11 of command management executed by the virtual storage system 100. Here, an example is shown where, in the event that the storage system 20 receiving the command from the host computer 51 does not have a function corresponding to this command, a storage system 20 having this function is searched for and the command is transferred to the retrieved storage system 20.

The following (1) to (2) are presumed in the description of FIG. 11.

(1) Each storage system 20 and the management server 50 are respectively held in the command-function correspondence table 104 and the function-device correspondence table 105.

(2) A storage system 20C having the function A is newly added to the virtual storage system 100 comprised of storage system 20A and 20B having the function B.

A process to add storage system 20C to the virtual storage system 100 is then carried out (S201). Namely, a process to connect the storage system 20C to the SAN 41 and recognize the host computer 51 and the virtualization device 52 (for example, recognition of a storage system identifier of the storage system 20C, recognition of the LUN of a logical unit within the storage system 20C, and recognition of a path number of a logical path connecting to this logical unit, etc.) is carried out. In the event that the storage system 20C shares the logical device 701 of the external storage system 70, the storage system 20 may be connected to SAN 43.

Next, the management server 50 recognizes that a storage system 20C is newly added to the virtual storage system 100, recognizes that the storage system 20C has a program P3, additionally registers a function A to the command-function correspondence table 104 managed by itself, and additionally registers storage system 20C to the function-device correspondence table 105 managed by itself (S202).

Information to the effect that the storage system 20C has a program P3 corresponding to function A may be acquired as a result of input by a user to the management server 50, or may be acquired from a program during installation of this program (program sending commands to program P3) corresponding to program P3 to the host computer 51.

Next, the management server 50 notifies the respective storage systems 20A, 20B that a program P3 possessed by the storage system 20C has been newly added to the virtual storage system 100 (S203). As a method of notifying the storage systems 20A, 20B that a new function has been added, the storage systems 20A, 20B may be notified by the management server 50 individually, the management server 50 may notify a specific storage system 20, or a specific storage system 20 may notify another storage system 20.

Next, the respective storage systems 20A, 20B additionally register the storage system 20C and the function A to the function-device correspondence tables 105 held within their own memories 22 in a correlating manner, and additionally register commands C001, C002, C003 and function A in the command-function correspondence table 104 in a correlating manner (S204).

Next, the management server 50 notifies the storage system 20C of a corresponding relationship of existing functions (programs) within the virtual storage system 100, commands corresponding to these functions, and storage systems 20 having these functions (S205).

After this, the storage system 20C additionally registers storage systems 20A, 20B and function B in a correlated manner to the function-device correspondence table 105 held within its own memory 22 and additionally registers command C004 and function B in a correlating manner to command-function correspondence table 104 based on information (the correspondence relationship of existing programs (functions) within the virtual storage system 100 and storage systems 20 having these programs), notification of which was given by the management server 50 (S206).

Next, the host computer 51 sends command C001 corresponding to program P3 to the virtual storage system 100 (S207). The host computer 51 does not transmit the command C001 while individually recognizing the individual storage systems 20A, 20B, 20C. Which of the storage systems 20A, 20B and 20C receives the command is therefore decided on a case by case basis. Here, the description is continued assuming the case that the storage system 20A receives the command C001.

When command C001 is received, the storage system 20A retrieves which program the command C001 corresponds to and which storage system 20 is in possession of this program by referring to the command-function correspondence table 104 and the function-device correspondence table 105 held within its own memory 22 (S208).

If the storage system 20C has received the command C001, the storage system 20C implements the steps S210 and S212 described in the following.

Next, the storage system 20A transfers command C001 to the storage system 20C via SAN 43 (S209). At this time, in the event that real data intended to be processed by command C001 exists in the storage system 20A, the storage system 20A sends the real data to the storage system 20C. Transmission of the real data may take place collectively a single time or may be carried out partially split across a plurality of times. In the event that real data the command C001 intends to process exists in the logical device 701 of the external storage system 70, supervision of control of the logical device 701 is changed from the storage system 20A to the storage system 20C.

The storage system 20A may also hold information correlating the command and the storage system 20 of the transfer destination as command transfer history information and then transfer a command to another storage system 20 by referring to this history information when a new command is received from the host computer 50.

Next, the storage system 20A notifies the host computer 51 of normal receipt of a command (S210).

After this, the storage system 20C notifies the storage system 20A of completion at the stage where processing of command C001 is complete (S211).

The storage system 20A receiving notification of completion from the storage system 20C then notifies the host computer 51 that the processing of command C001 is complete (S212).

As a further method of command management shown in FIG. 11, a method exists where, for example, execution of the steps takes place in the order of step S201, S202, S205, S206, the storage system 20C notifies the storage systems 20A, 20B that program P3 and storage system 20C have been newly added, step S204 is then implemented, and execution of S207 to S212 then takes place in order.

Figure 12:
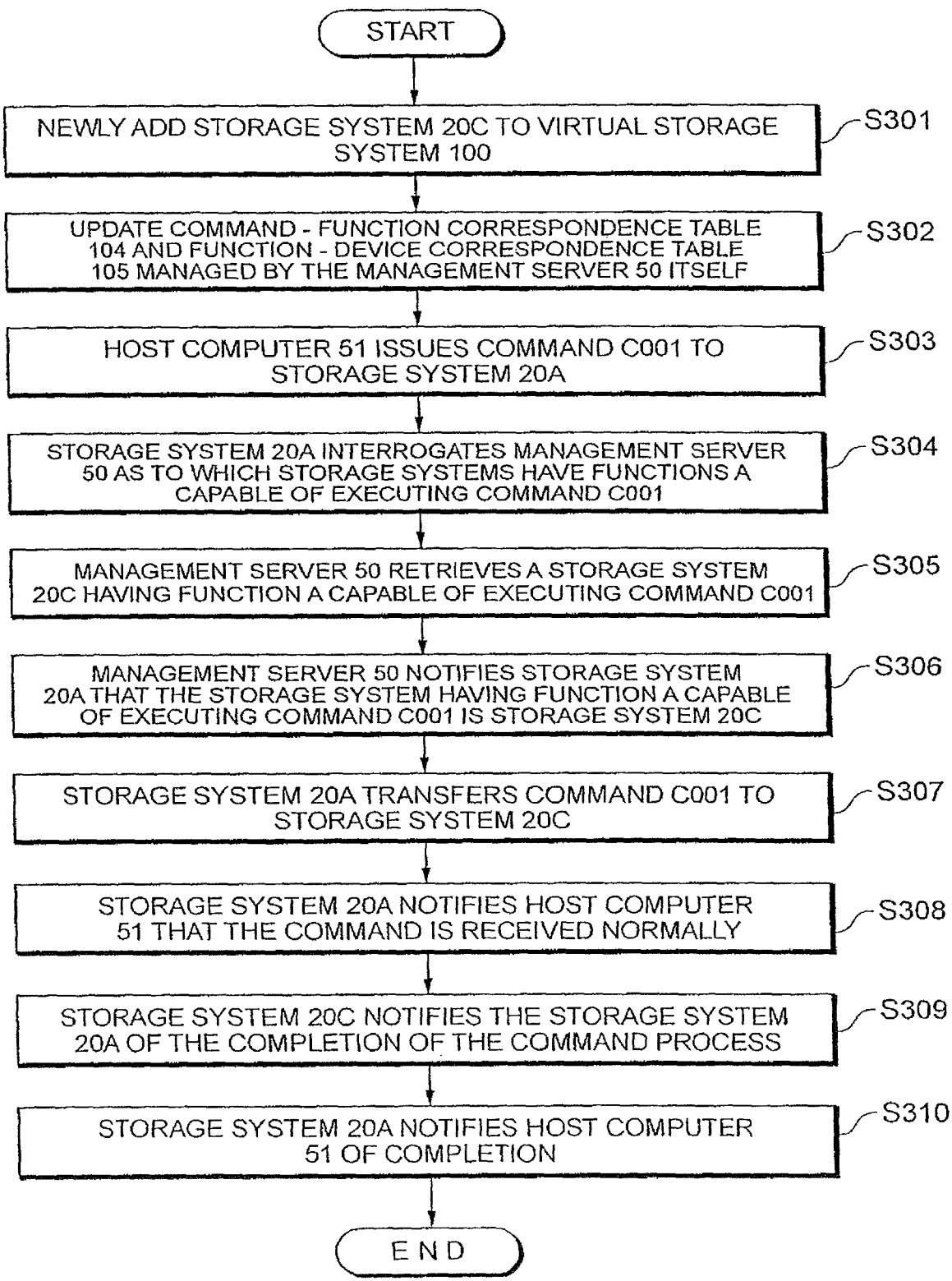
FIG. 12 is a flowchart showing further command management executed by a virtual storage system.

Next, a description is given with reference to FIG. 12 of further command management executed by the virtual storage system 100. Here, an example is shown where, in the event that the storage system 20 receiving the command from the host computer 51 does not have a function corresponding to this command, the management server 50 is interrogated as to which storage system 20 has this function. The management server 50 receiving this interrogation retrieves the storage system 20 having the function corresponding to this command and notifies the storage system 20 that is the destination of this interrogation. The storage system 20 receiving notification from the management server 50 then transfers the command to the storage system 20 having the function corresponding to this command.

The following (1) to (2) are presumed in the description of FIG. 12.

(1) It is necessary for the management server 50 to hold the command-function correspondence table 104 and the function-device correspondence table 105 but it is not necessary for each storage system 20 to hold the command-function correspondence table 104 and the function-device correspondence table 105.

(2) A storage system 20C having the function A is newly added to the virtual storage system 100 comprised of storage system 20A and 20B having the function B.

A process to add storage system 20C to the virtual storage system 100 is then carried out (S301). Namely, a process to connect the storage system 20C to the SAN 41 and recognize the host computer 51 and the virtualization device 52 (for example, recognition of a storage system identifier of the storage system 20C, recognition of the LUN of a logical unit within the storage system 20C, and recognition of a path number of a logical path connecting to this logical unit, etc.) is carried out. In the event that the storage system 20C shares the logical device 701 of the external storage system 70, the storage system 20 may be connected to SAN 43.

Next, the management server 50 recognizes that a storage system 20C is newly added to the virtual storage system 100, recognizes that the storage system 20C has a program P3, additionally registers a function A to the command-function correspondence table 104 managed by itself, and additionally registers storage system 20C to the function-device correspondence table 105 managed by itself (S302).

Next, the host computer 51 sends command C001 corresponding to program P3 to the virtual storage system 100 (S303). The host computer 51 does not transmit the command C001 while individually recognizing the individual storage systems 20A, 20B, 20C. Which of the storage systems 20A, 20B and 20C receives the command is therefore decided on a case by case basis. Here, the description is continued assuming the case that the storage system 20A receives the command C001.

Next, upon receiving the command C001, the storage system 20A determines whether or not it is itself in possession of function A capable of executing command C001. In this embodiment, the storage system 20A is not in possession of function A capable of executing command C001 and therefore interrogates the management server 50 as to which storage system 20 is in possession of the function A capable of executing command C001 (S304).

If the storage system 20A is in possession of the function A capable of executing the command C001, the storage system 20A executes step S307 and S309 described in the following.

The management server 50 receiving the interrogation then refers to the command-function correspondence table 104 and the function-device correspondence table 105 it manages itself and retrieves the storage system 20C having the function A capable of executing the command C001 (S305).

Next, the management server 50 notifies the storage system 20A that the storage system 20 in possession of the function A capable of executing the command C001 is the storage system 20C (S306).

Next, the storage system 20A transfers command C001 to the storage system 20C (S307). At this time, in the event that real data intended to be processed by command C001 exists in the storage system 20A, the storage system 20A sends the real data to the storage system 20C. Transmission of the real data may take place collectively a single time or may be carried out partially split across a plurality of times. In the event that real data the command C001 intends to process exists in the logical device 701 of the external storage system 70, supervision of control of the logical device 701 is changed from the storage system 20A to the storage system 20C.

Next, the storage system 20A notifies the host computer 51 of normal receipt of a command (S308).

After this, the storage system 20C notifies the storage system 20A of completion at the stage where processing of command C001 is complete (S309).

The storage system 20A receiving notification of completion from the storage system 20C then notifies the host computer 51 that the processing of command C001 is complete (S310).

Here, the network configuration of FIG. 1 is such that the networks (SAN 41, 42) for issuing commands from the host computer 51 to each storage system 20 and the network (management network 40) for the management server 50 to transmit and receive management information between each storage system 20 are different outbound methods but this embodiment may also be applied to inbound methods. For example, this becomes an inbound method if a configuration is adopted where the management server 50 transmits and receives management information to and from each storage system 20 via the SAN 41.

Figure 13:
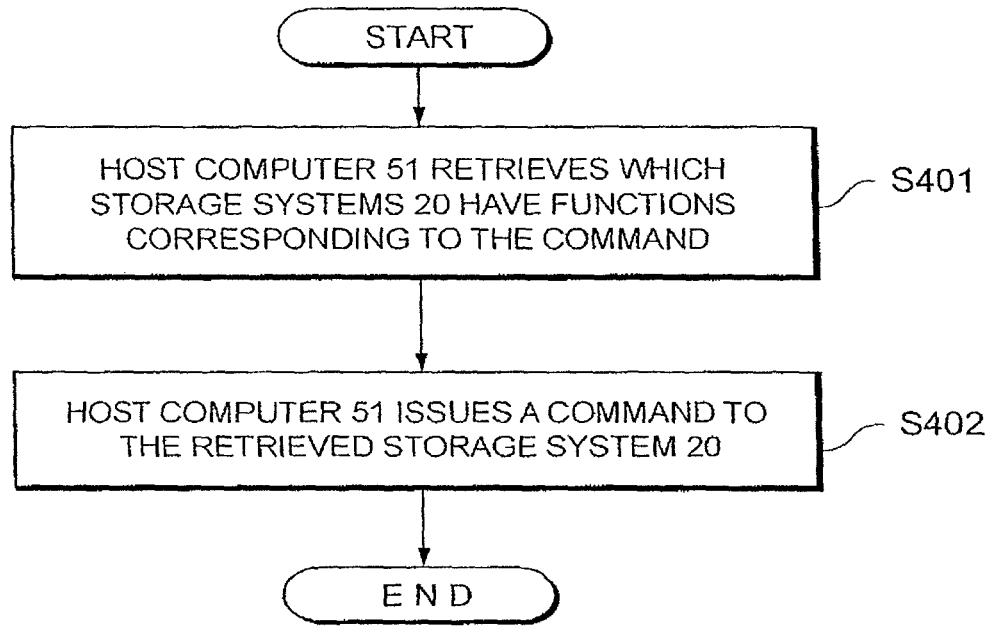
FIG. 13 is a flowchart showing command management executed by a host computer.

Next, a description is given with reference to FIG. 13 of command management executed by the host computer 51. Here, the host computer 51 holds the alternate path software 61, the command-function correspondence table 104, and the function-device correspondence table 105, and is aware of the storage system 20 in possession of the function corresponding to the command and of the logical path connecting from the host computer 51 to the logical device under the management of the storage system 20.

While a command is issued, the host computer 51 refers to the command-function correspondence table 104 and the function-device correspondence table 105 so as to retrieve which storage system 20 is in possession of the function corresponding to this command (S401).

Next, the host computer 51 selects a logical device to connect to the host computer 51 from the logical devices under the control of the retrieved storage system 20 and issues the command (S402). In this way, the host computer 51 can directly issue a command to the storage system 20 in possession of the function corresponding to the command.

The host computer 51 may also issue a command by establishing a logical path in advance to all the logical devices under the control of the storage system 20 and selecting a logical path connecting to a logical device under the control of the storage system 20 in possession of the function corresponding to the command using the alternate path software 61.

Figure 14:
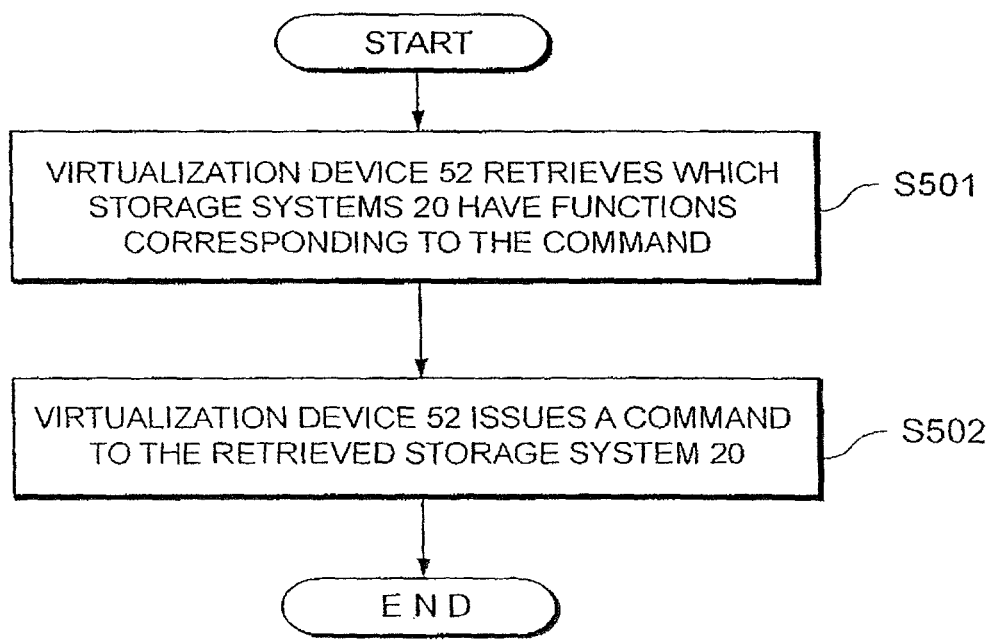
FIG. 14 is a flowchart showing command management executed by a virtual device.

Next, a description is given with reference to FIG. 14 of command management executed by the virtualization device 52. Here, the virtualization device 52 holds the alternate path software 61, the command-function correspondence table 104, and the function-device correspondence table 105, and is aware of the storage system 20 in possession of the function corresponding to the command and of the logical path connecting from the virtualization device 52 to the logical device under the management of the storage system 20.

When a command is received from the host computer 51, the virtualization device 52 refers to the command-function correspondence table 104 and the function-device correspondence table 105 so as to retrieve which storage system 20 is in possession of the function corresponding to this command (S501).

Next, the virtualization device 52 selects a logical device connected to the virtualization device 52 via the logical path from the logical devices under the control of the retrieved storage system 20 and transfers a command (S502). In this way, the virtualization device 52 can transfer a command to the storage system 20 in possession of the function corresponding to the command.

The virtualization device 52 may also transfer a command by establishing a logical path in advance to all the logical devices under the control of the storage system 20 and selecting a logical path connecting to a logical device under the control of the storage system 20 in possession of the function corresponding to the command using the alternate path software 61.

The command process shown in FIG. 14 may also be executed at a virtualization layer virtualizing a plurality of storage systems 20 into a single virtual storage system 100.

Figure 15:
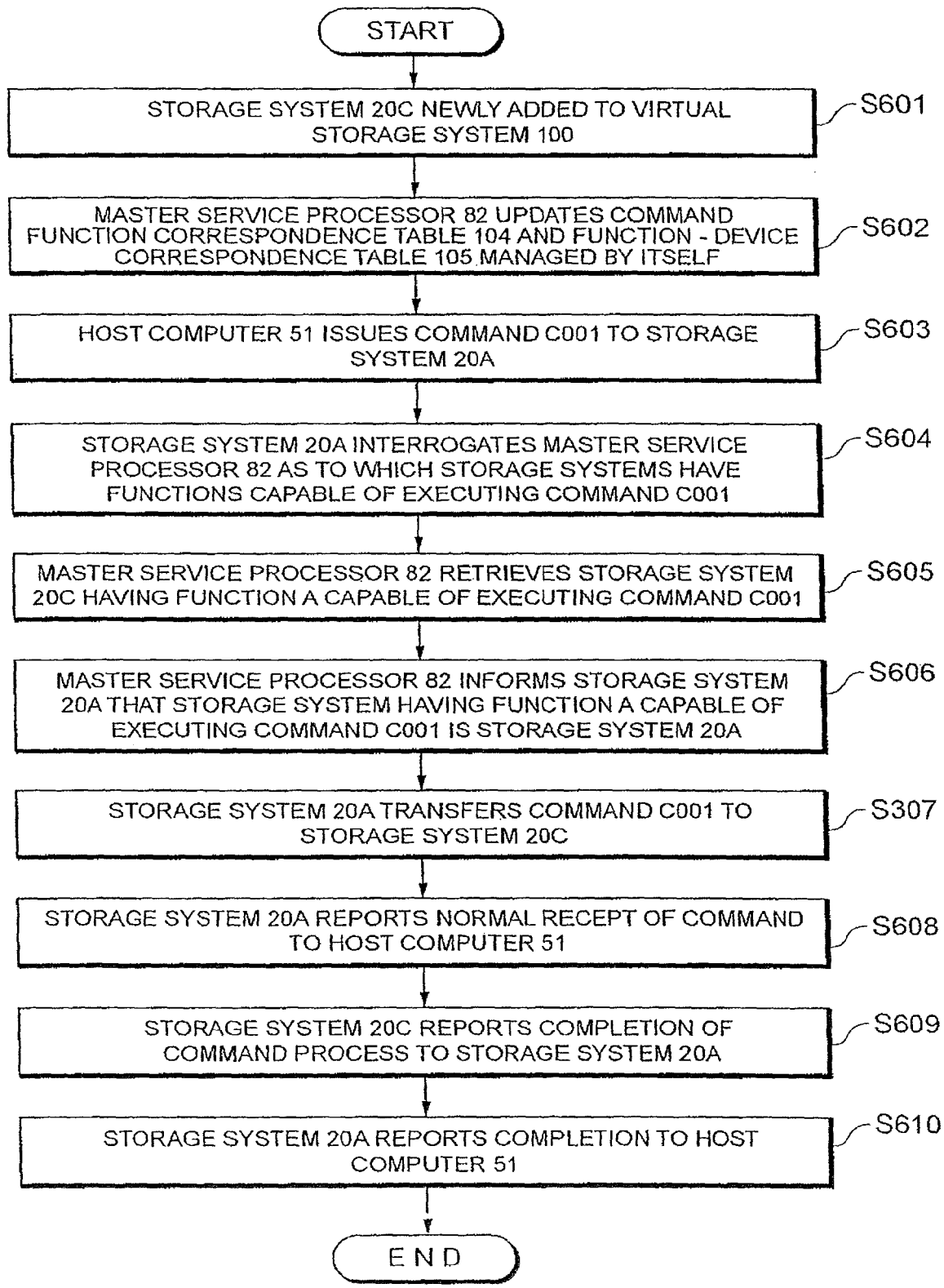
FIG. 15 is a flowchart showing command management executed by a master service processor.

Next, a description is given with reference to FIG. 15 of a command process executed by the master service processor 82. Here, an example is shown where, in the event that the storage system 20 receiving the command from the host computer 51 does not have a function corresponding to this command, the master service processor 82 is interrogated as to which storage system 20 has this function. The master service processor 82 receiving this interrogation retrieves the storage system 20 having the function corresponding to this command and notifies the storage system 20 that is the destination of this interrogation. The storage system 20 receiving notification from the master service processor 82 transfers the command to the storage system 20 having the function corresponding to this command.

The following (1) to (2) are presumed in the description of FIG. 15.

(1) It is necessary for the master service processor 82 to hold the command-function correspondence table 104 and the function-device correspondence table 105 but it is not necessary for each storage system 20 to hold the command-function correspondence table 104 and the function-device correspondence table 105.

(2) A storage system 20C having the function A is newly added to the virtual storage system 100 comprised of storage system 20A and 20B having the function B.

A process to add storage system 20C to the virtual storage system 100 is then carried out (S601). Namely, a process to connect the storage system 20C to the SAN 41 and recognize the host computer 51 and the virtualization device 52 (for example, recognition of a storage system identifier of the storage system 20C, recognition of the LUN of a logical unit within the storage system 20C, and recognition of a path number of a logical path connecting to this logical unit, etc.) is carried out. In the event that the storage system 20C shares the logical device 701 of the external storage system 70, the storage system 20 may be connected to SAN 43.

Next, the master service processor 82 recognizes that a storage system 20C is newly added to the virtual storage system 100, recognizes that the storage system 20C has a program P3, additionally registers a function A to the command-function correspondence table 104 managed by itself, and additionally registers storage system 20C to the function-device correspondence table 105 managed by itself (S602).

Next, the host computer 51 sends command C001 corresponding to program P3 to the virtual storage system 100 (S603). The host computer 51 does not transmit the command C001 while individually recognizing the individual storage systems 20A, 20B, 20C. Which of the storage systems 20A, 20B and 20C receives the command is therefore decided on a case-by-case basis. Here, the description is continued assuming the case that the storage system 20A receives the command C001.

Next, upon receiving the command C001, the storage system 20A determines whether or not it is itself in possession of function A capable of executing command C001. In this embodiment, the storage system 20A is not in possession of function A capable of executing command C001 and therefore interrogates the master service processor 82 as to which storage system 20 is in possession of the function A capable of executing command C001 (S604).

If the storage system 20A is in possession of the function A capable of executing the command C001, the storage system 20A executes step S307 and S309 described in the following.

The master service processor 82 receiving the interrogation then refers to the command-function correspondence table 104 and the function-device correspondence table 105 it manages itself and retrieves the storage system 20C having the function A capable of executing the command C001 (S605).

Next, the master service processor 82 notifies the storage system 20A that the storage system 20 in possession of the function A capable of executing the command C001 is the storage system 20C (S606).

The storage system 20A then transfers command C001 to the storage system 20C (S607). At this time, in the event that real data intended to be processed by command C001 exists in the storage system 20A, the storage system 20A sends the real data to the storage system 20C. Transmission of the real data may take place collectively a single time or may be carried out partially split across a plurality of times. In the event that real data the command C001 intends to process exists in the logical device 701 of the external storage system 70, supervision of control of the logical device 701 is changed from the storage system 20A to the storage system 20C.

Next, the storage system 20A notifies the host computer 51 of normal receipt of a command (S608).

After this, the storage system 20C notifies the storage system 20A of completion at the stage where processing of command C001 is complete (S609).

The storage system 20A receiving notification of completion from the storage system 20C then notifies the host computer 51 that the processing of command C001 is complete (S610).

In the above description, an example is shown of command management where the master service processor 82 holds the command-function correspondence table 104 and function-device correspondence table 105, but it is also possible for the service processor 81 to hold the command-function correspondence table 104 and function-device correspondence table 105. However, as the service processor 81 is connected to the respective storage systems 20, even if the service processor 81 is capable of determining whether or not it is a storage system 20 having a function corresponding to the command itself, it is not capable of determining whether or not other storage systems 20 are storage systems 20 having a function corresponding to the command. With regards to this, the master service processor 82 is capable of managing functions of all of the storage systems 20 and is therefore capable of determining which storage system 20 is a storage system 20 having a function corresponding to the command.

Figure 16:
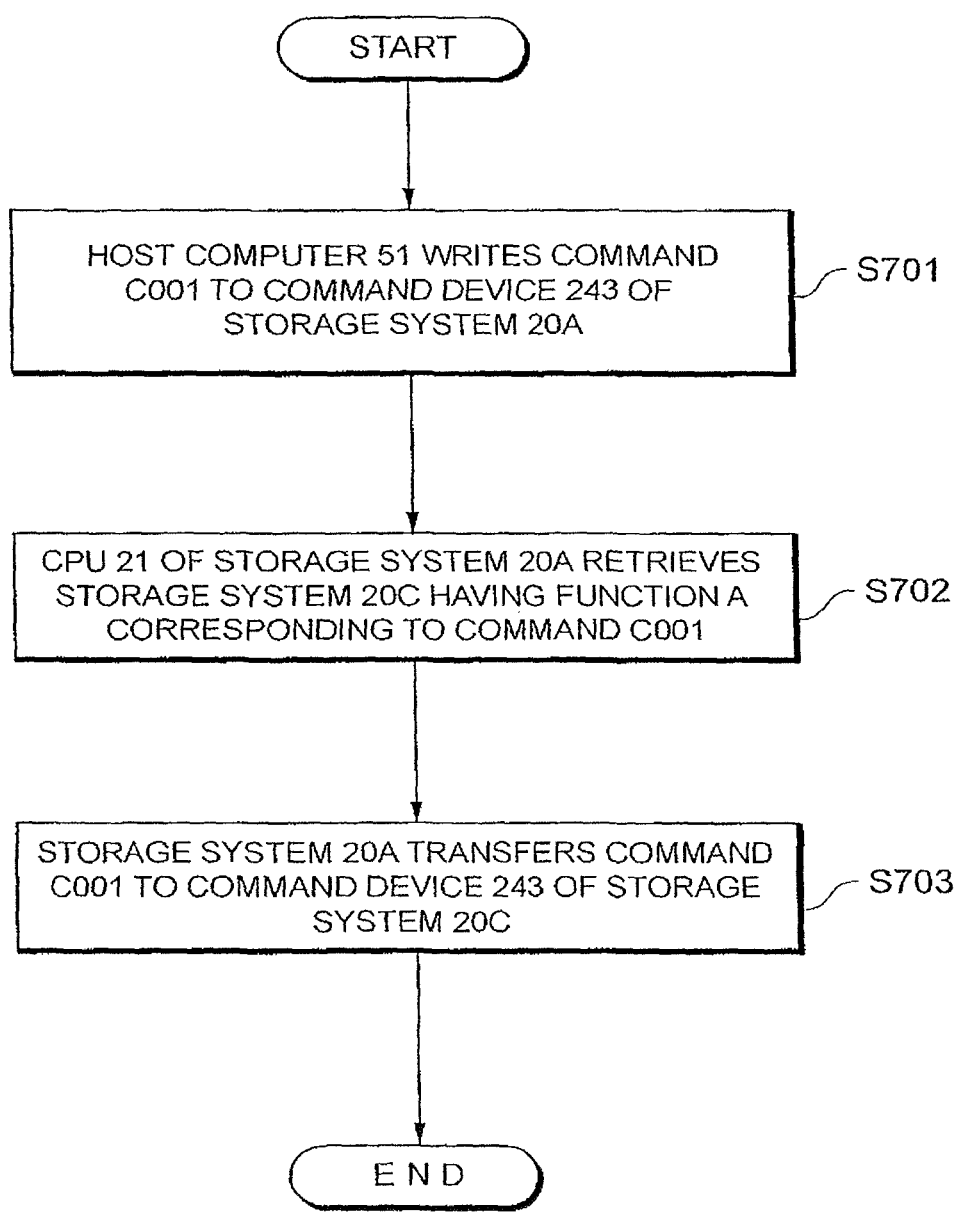
FIG. 16 is a flowchart showing command management using a command device.

Next, a description is given with reference to FIG. 16 of command management used by the command device 243. It is taken that the command-function correspondence table 104 and function-device correspondence table 105 are stored in the memory 22 of each storage system 20 and the command device 243.

The host computer 51 writes the command C001 to the command device 243 of the storage system 20A (S701).

When it is detected that command C001 has been written to the command device 243, the CPU 21 of the storage system 20A refers to the command-function correspondence table 104 and function-device correspondence table 105 stored in the memory 22 and the command device 243 and retrieves the storage system 20C in possession of the function A corresponding to the command C001 (S702).

In the event that the results of this retrieval determine that the function A corresponding to the command C001 is not an own function but rather is a function of another storage system 20C, the storage system 20A does not send the command C001 back to the host computer 51 but rather extends the command process and transfers the command C001 to the command device 243 of the storage system 20C (S703).

In the event that the command received by the command device 243 of the storage system 20A is transferred to the storage system 20C, transfer takes place to the command device 243 of the storage system 20C using the method with which the command device 243 received the command. In this case, the command device 243 of the storage system 20C has a method for detecting the storage system 20A. In the event that there is no command device 243 at the storage system 20C, it is possible to transfer the command from the storage system 20A to the storage system 20C after converting the command to a format recognizable by the storage system 20C.

Figure 17:
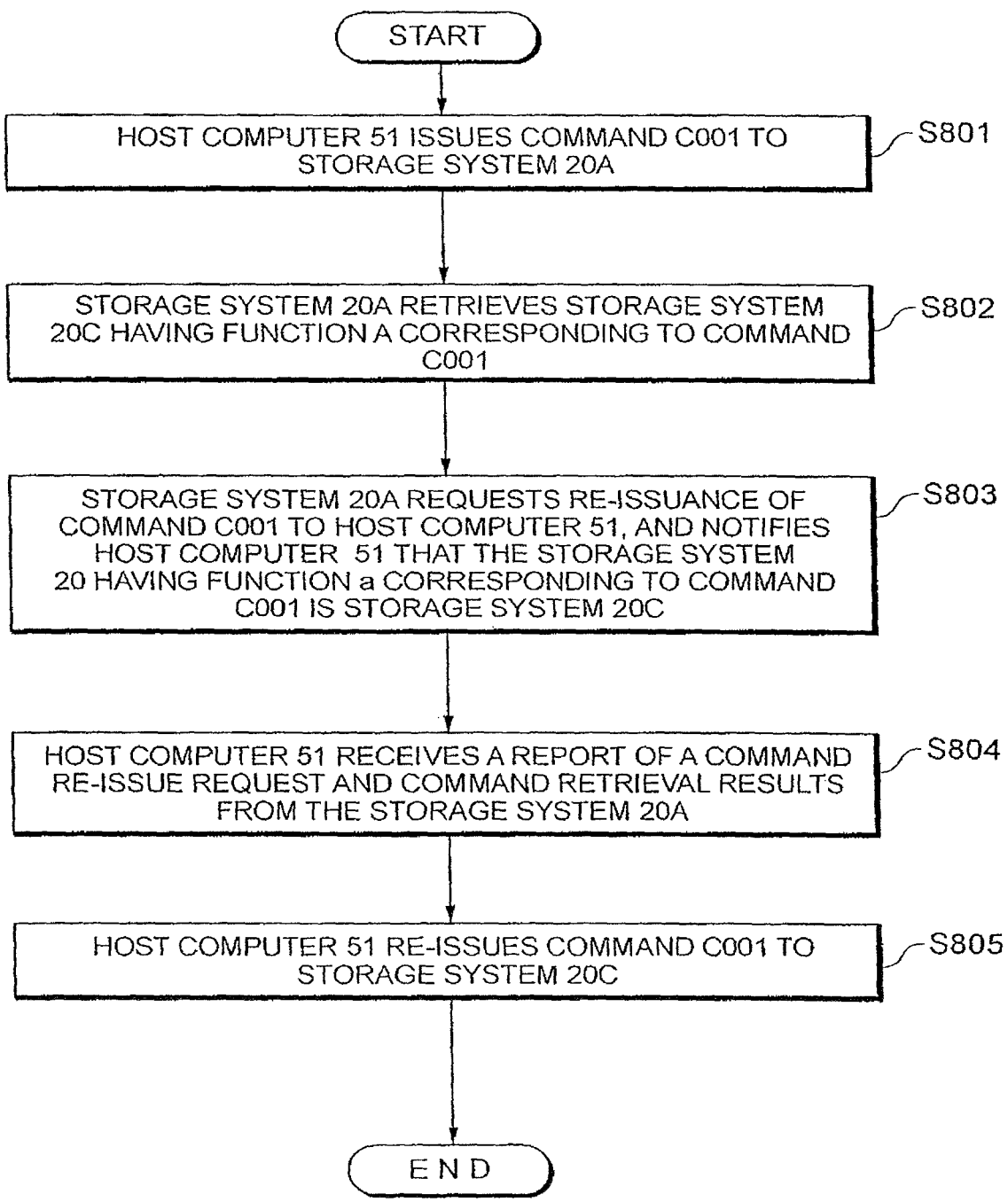
FIG. 17 is a flowchart showing a process for carrying out command management as a result of a host computer re-issuing a command.

Next, a description is given with reference to FIG. 17 of a process for carrying out command management as a result of the host computer 51 re-issuing a command. When a command is received from the host computer 51, the storage system 20A retrieves a storage system 20 in possession of the function corresponding to the command (FIG. 11: S208). The storage system 20A then requests re-issuance of the command to the host computer 51 and notifies the host computer 51 of which storage system 20 is in possession of the function corresponding to the command. The host computer 51 receiving the command reissue request then re-issues the command to the storage system in possession of the function corresponding to the command.

The host computer 51 then issues the command C001 to the storage system 20A (S801).

Next, the storage system 20A refers to the command-function correspondence table 104 and function-device correspondence table 105 managed by itself and retrieves the storage system 20C in possession of the function A corresponding to the command C001 (S802).

The storage system 20A requests re-issue of the command C001 to the host computer 51 and, notifies the host computer 51 that the storage system 20 in possession of the function A corresponding to the command C001 is the storage system 20C (S803).

The host computer 51 then receives the command re-issue request and notification that the storage system 20 in possession of the function A corresponding to the command C001 is the storage system 20C from the storage system 20A (S804).

Next, the host computer 51 re-issues the command C001 to the storage system 20C (S805). At this time, in the event that real data intended to be processed by command C001 exists in the storage system 20A, the storage system 20A sends the real data to the storage system 20C. Transmission of the real data may take place collectively a single time or may be carried out partially split across a plurality of times. In the event that real data the command C001 intends to process exists in the logical device 701 of the external storage system 70, supervision of control of the logical device 701 is changed from the storage system 20A to the storage system 20C.

In the above description, an example is shown where the storage system 20A retrieves which storage system 20 is in possession of the function corresponding to the command issued by the host computer 51 but it is also possible for this to be retrieved by the management server 50 or master service processor 82, with the host computer 51 being notified of command re-issue requests and retrieval results etc.

Further, a command re-issue request is by no means essential to the process of FIG. 17. The host computer 51 may also re-issue the command C001 to the storage system 20C at the stage of receiving notification that the storage system 20 in possession of the function A corresponding to the command C001 is the storage system 20C from the storage system 20A.

In cases where a plurality of storage systems 20 in possession of the function corresponding to the command issued by the host computer 51 exist in each of the processes shown in FIG. 11 to FIG. 17, it is preferable to transfer commands to storage systems 20 of a low rate of operation (busy rate), storage systems 20 related to the task, or to storage systems 20 that were not selected on the previous occasion, etc.

Further, in the above description, the case where the function corresponding to the command is implemented by a single storage system 20 is supposed but this embodiment is also applicable to cases where the function corresponding to the command is implemented by two or more storage systems 20. For example, it is necessary for a storage system 20 of a local site (copy source) and a storage system 20 of a remote site (copy destination) to be loaded with a remote copy function to execute remote copying. For example, in the event that a storage system 20C that is not in possession of a remote copy function receives a remote copy request, the storage system 20C may retrieve the storage systems 20A, 20B in possession of the remote copy function, transfer the remote copy command from the storage system 20C to the storage systems 20A, 20B, and execute remote copying between the storage system 20A and the storage system 20B.

Figure 18:
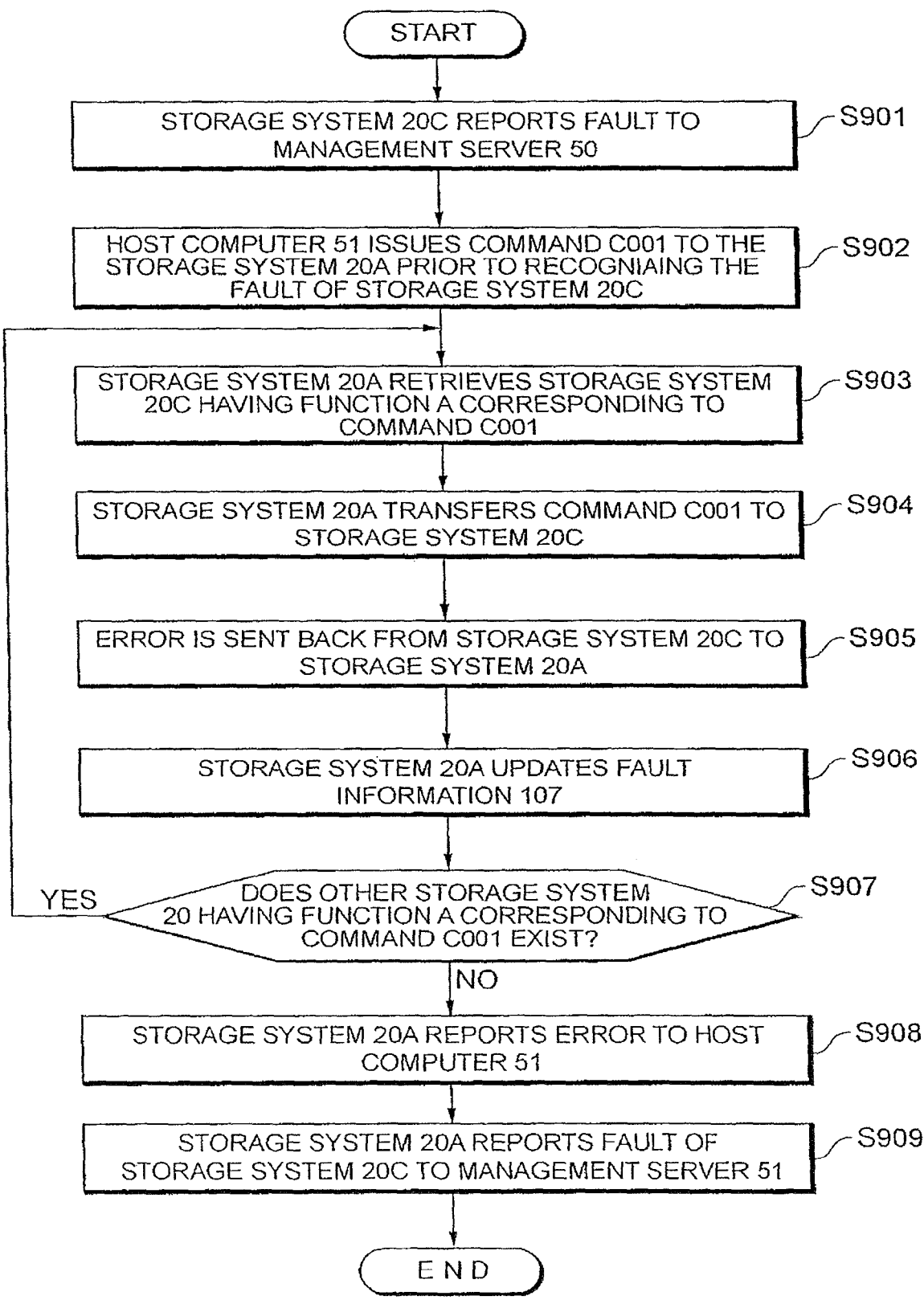
FIG. 18 is a flowchart showing a process at the time of a fault occurring during transfer of a command.

Next, a description is given with reference to FIG. 18 of a process for when a fault occurs during transfer of a command in the method of FIG. 11 to FIG. 16. Here, a description is given of an example where a fault occurs at the storage system 20C and the host computer 51 issues the command C001 to the storage system 20A directly after notification of a fault report from the storage system 20C to the management server 50 (i.e. when the host computer 51 and the storage system 20B do not recognize the fault of the storage system 20C).

When a fault occurs at the storage system 20C, the storage system 20C reports the fault to the management server 50 (S901).

Next, the host computer 51 issues the command C001 to the storage system 20A prior to recognizing the fault of the storage system 20C (S902).

After this, the storage system 20A refers to the command-function correspondence table 104 and function-device correspondence table 105 managed by itself and retrieves the storage system 20C in possession of the function A corresponding to the command C001 (S903).

The storage system 20A then transfers command C001 to the storage system 20A (S904).

However, an error is sent back from the storage system 20C to the storage system 20A because there is a fault at the storage system 20C (S905).

The storage system 20A then recognizes the storage system 20C is faulty as a result of receiving the error report from the storage system 20C, and the "status" of the storage system 20C of the fault information 107 is updated to "faulty" (S906).

If another storage system 20 in possession of the function A corresponding to the command C001 exists (S907: YES), the storage system 20A returns to the process of step S903.

On the other hand, if another storage system 20 in possession of the function A corresponding to the command C001 does not exist (S907: NO), the storage system 20A reports an error to the host computer 51 (S908).

Next, the storage system 20A reports the fault of the storage system 20C to the management server 51 (S909). When the fault report is received from the storage system 20A, the management server 51 updates the "status" of the storage system 20C of the fault information 107 managed by itself to "faulty".

Figure 19:
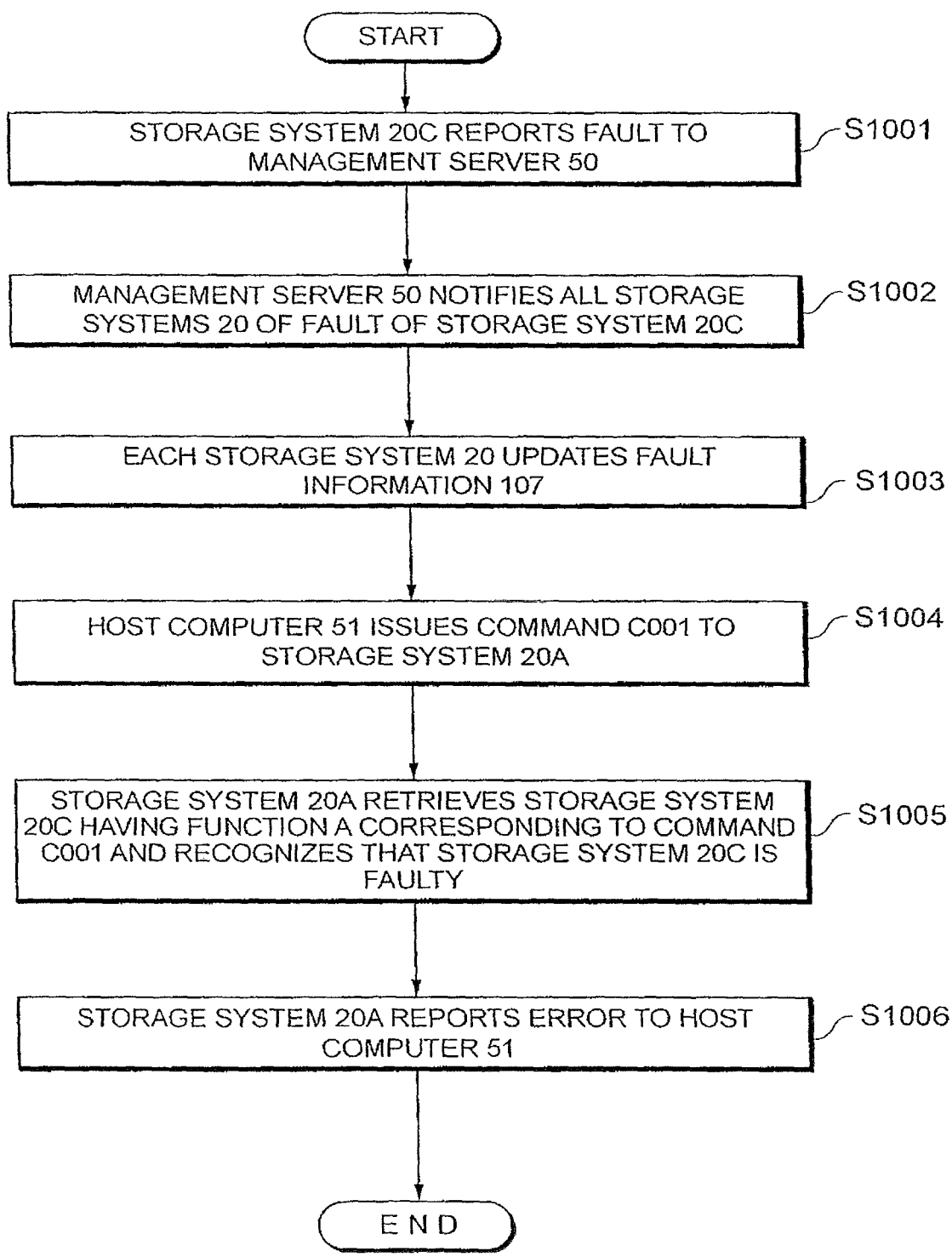
FIG. 19 is a flowchart showing a further process for when a fault occurs during transfer of a command.

Next, a description is given with reference to FIG. 19 of another process for when a fault occurs during transfer of a command in the method of FIG. 11 to FIG. 16. Here, a description is given of an example of a case where the command C001 is issued from the host computer 51 to the storage system 20A after a fault occurs at the storage system 20C, the management server 50 is notified of a fault report by the storage system 20C, and each of the storage systems 20 are notified of the fault report by the management server 51 (i.e. when each storage system 20 recognizes the fault of the storage system 20C).

When a fault occurs at the storage system 20C, the storage system 20C reports the fault to the management server 50 (S1001).

Next, the management server 50 notifies all of the storage systems 20 within the virtual storage system 100 of the fault of the storage system 20C (S1002).

Each storage system 20 then recognizes that the storage system 20C is currently faulty from the notification from the management server 50 and updates the "status" of the storage system 20C of the fault information 107 to "faulty" (S1003).

Next, the host computer 51 issues the command C001 to the storage system 20A prior to recognizing the fault of the storage system 20C (S1004).

Next, the storage system 20A refers to the command-function correspondence table 104 and function-device correspondence table 105 managed by itself, retrieves the storage system 20C in possession of the function A corresponding to the command C001, refers to the fault information 107, and recognizes that the storage system 20C is faulty (S1005).

The storage system 20A then reports an error to the host computer 51 (S1006).

In step S1005, in the event that a plurality of storage systems 20 in possession of a function A corresponding to the command C001 exist, the storage system 20A may also transfer the command C001 to a storage system 20 operating normally.

Next, a description is given with reference to FIG. 20 of load distribution within the virtual storage system 100. Here, an example is shown of the case where the load on the storage system 20C of the plurality of storage systems 20 within the virtual storage system 100 is large.

The management server 50 acquires load information from each of the storage systems 20 within the virtual storage system 100 and recognizes that the load is concentrated on the storage system 20C (S1101). Resource rate of operation and occupancy rate of each storage system 20 etc. exists as load information.

Next, the management server 50 notifies the storage system 20C that the load is concentrated on the storage system 20C (S1102).

After this, the storage system 20C selects logical devices that are not using the program P3 only installed on the storage system 20C (hereinafter referred to as transfer candidate logical devices) as logical devices that are transfer candidates (S1103). The reason logical devices that are not using the program P3 installed only on storage system 20C are selected as transfer candidate logical devices is because there is no load dispersion in the case where the load on the program P3 installed only on storage system 20C is large even if a logical device using the program P3 is selected as a logical device that is a candidate for transfer.

Next, the storage system 20C notifies the management server 50 of transfer of the transfer candidate logical device (S1104).

The management server 50 then refers to the resource rate of operation of each storage system 20 and determines a transfer destination storage system 20 for the transfer candidate logical device (S1105). Here, an example is shown of the case where storage system 20A is selected as the transfer destination storage system 20.

Next, the management server 50, in addition to designating the storage system 20A of the transfer destination at the storage system 20C, transmits a transfer instruction for the transfer candidate logical device (S1106).

Next, the storage system 20C transfers the transfer candidate logical device to the transfer destination storage system 20A under the instruction of the management server 50 (S1107).

Which storage system 20 is made the transfer destination storage system 20 may be inputted to the storage system 20C by a system administrator via the service processor 81 or may be designated by the host computer 51 to be the storage system 20C.

A command process taking into consideration differences in performance of the plurality of storage systems 20 constituting the virtual storage system 100 is described with reference to FIG. 21 and FIG. 22. In the event that there are differences in performance between the plurality of storage systems 20 constituting the virtual storage, it is possible to improve the overall processing performance of the virtual storage system 100 by having the high-performance storage systems process the bulk of the I/O requests.

FIG. 21 shows specification information 109. The specification information 109 is comprised of processing power, port performance, and caching capacity, etc. of each storage system 20A, 20B, 20C. The specification information 109 is stored in the memory 22 of each storage system 20, the management server 50, the master service processor 82, and the service processor 81, etc.

Next, a command process taking into consideration differences in performance of the plurality of storage systems 20 is described with reference to FIG. 22. Here, an example is shown of the case where each storage system 20 holds the specification information 109.

When the command is received from the host computer 51 (S1201), the storage system 20A refers to the specification information 109 and retrieves high-performance storage systems from the virtual storage system 100 (S1202). Here, an example is shown where the storage system 20C is a high-performance storage system.

The storage system 20A transfers the command from the host computer 51 to the storage system 20C (S1203). It is then possible to improve the overall processing performance of the virtual storage system 100 by having the high-performance storage system process a large number of commands. For example, with a usual host access, it is preferable for as much processing as possible to be carried out at the high-performance storage system 20C, with processes such as I/O processes such as copying etc. (that do not require high-performance) being carried out at the other storage system 20A.

It is preferable for what extent the high-performance storage system 20C and the other storage system 20A process I/O requests to be determined using a ratio identifying the difference in performance of the high-performance storage system 20C and the other storage system 20A. For example, if the caching capacity of the high-performance storage system 20C is twice the caching capacity of the other storage system 20A, the number of I/O processes of the high-performance storage system 20C is made to be twice the number of I/O processes of the other storage system 20A.

A command process taking into consideration differences in rate of operation of the plurality of storage systems 20 constituting the virtual storage system 100 is described with reference to FIG. 23 and FIG. 24. In the event that there are differences in rate of operation between the plurality of storage systems 20 constituting the virtual storage system 100, it is possible to improve the overall processing performance of the virtual storage system 100 by having the low rate of operation storage systems 20 process the bulk of the I/O requests.

FIG. 23 shows rate of operation information 110. The rate of operation information 110 contains the range of operation of each storage system 20A, 20B, 20C (the processor usage rate of CPU 22, the number of I/O processes (IOPS) occurring per unit time of the CPU 22, the data transfer amount (transfer rate) per unit time of the interface control section 26, and the time (response time) between the storage system 20 receiving an I/O request from the host computer 51 and making a response, etc.). The rate of operation information 110 is stored in the memory 22 of each storage system 20, the management server 50, the master service processor 82, and the service processor 81, etc.

Next, a command process taking into consideration differences in rate of operation of the plurality of storage systems 20 is described with reference to FIG. 24. Here, an example is shown of the case where each storage system 20 holds rate of operation information 110.

When the command is received from the host computer 51 (S1301), the storage system 20A refers to the rate of operation information 110 and retrieves a low rate of operation storage system 20 from within the virtual storage system 100 (S1302). Here, an example is shown of the case where the rate of operation of the storage system 20C is low.

The storage system 20A transfers the command from the host computer 51 to the storage system 20C (S1303). It is then possible to improve the overall processing performance of the virtual storage system 100 by having the low rate of operation storage system 20C process a large number of commands. For example, with a usual host access, it is preferable for as much processing as possible to be carried out at the low rate of operation storage system 20C, with processes such as I/O processes such as copying etc. (that do not require a low rate of operation) being carried out at the other storage system 20A.

It is preferable for what extent the low rate of operation storage system 20C and the other storage system 20A process I/O requests to be determined using a ratio identifying the difference in rate of operation of the low rate of operation storage system 20C and the other storage system 20A. For example, if the rate of operation of the storage system 20C is half of the rate of operation of the other storage system 20A, the number of I/O processes of the storage system 20C is made to be twice the number of I/O processes of the other storage system 20A.

If, while implementing a command process (FIG. 22) taking into consideration differences in performance of the storage systems 20 or implementing a command process (FIG. 24) taking into consideration differences in the rate of operation of the storage systems 20, if I/O requests intended for processing by the storage system 20A are processed by the storage system 20C, it is preferable for a logical device storing real data to be moved from the storage system 20A to the storage system 20C, and for an I/O request to be issued from the host computer 51 to the storage system 20C. In the event that real data is stored in the external storage system 70, it is preferable to switch supervision of control of the external storage system 70 over from the storage system 20A to the storage system 20C.

Further, "a main section retrieving a high-performance system" or "a main section retrieving a low rate of operation storage system" is not limited to each of the storage systems 20 and may also be, for example, the management server 50, the service processor 81, the master service processor 82, the host computer 51, or the virtualization device 52. Namely, the processing procedure while the storage system 20A receiving the command from the host computer 51 transfers the command to the storage system 20C in the process of FIG. 11 to FIG. 20 described above may conform to a method of substituting "retrieval of a storage system having a function corresponding to a command" with "retrieval of high-performance storage system" or "retrieval of low rate of operation storage system".

Figure 25:
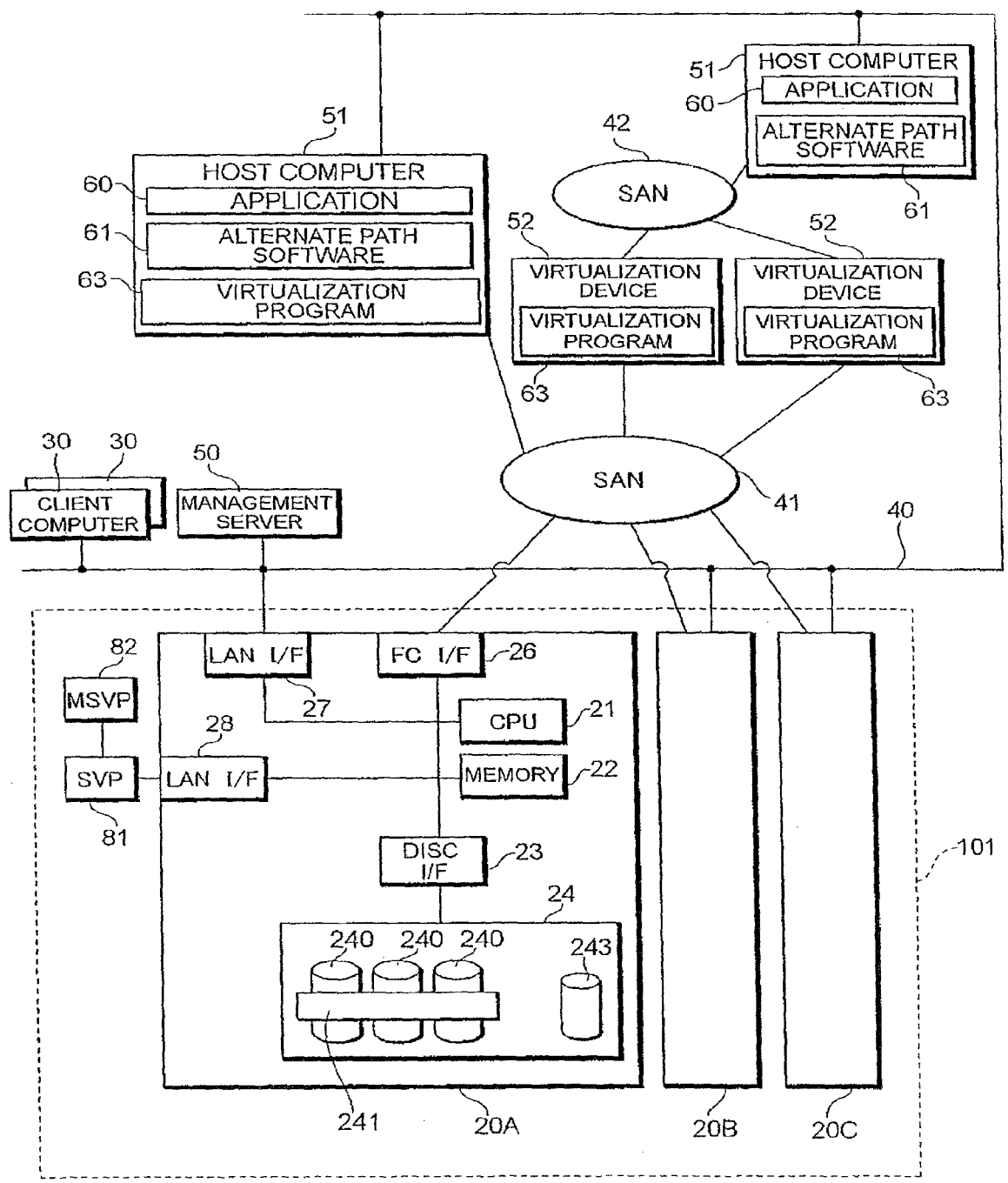
FIG. 25 is a system configuration view of a virtual storage system of this embodiment.

FIG. 25 shows a system configuration of a virtual storage system 101. Devices etc. with the same numerals as numerals shown in FIG. 1 are the same devices etc. and detailed description thereof is therefore omitted. The virtual storage system 101 virtualizes the plurality of storage systems 20A, 20B, 20C into a single storage system 101. The point of distinction with the virtual storage system 100 shown in FIG. 1 is that the virtual storage system 101 does not have an external storage system 70. Namely, each storage system 20 has a real device for storing real data. It is also possible to carry out processes (processes shown in FIG. 11 to FIG. 22) such as the command management and fault processing etc. described above for the virtual storage system 101.

According to this embodiment, it is possible to process commands from a host computer 51 in an appropriate manner even in cases where the functions in the possession of each storage system 20 are different in virtual storage systems 100, 101 virtualizing a plurality of storage systems 20 as a single storage resource. Further, it is possible to share functions of each storage system 20 for the virtual storage systems 100, 101 as a whole even in cases where new and old storage systems 20 are mixed up so that the functions of each storage system 20 are different.

What is claimed is:

1. A computer system coupled to a host computer and a management server, the computer system comprising first, second and third storage systems which are each separate from and do not include the management server or the host computer, wherein the first storage system and the second storage system each are coupled to the host computer and the management server and each comprise a virtual storage system for the host computer, wherein the first storage system is coupled to the host computer without the second storage system being interposed between the first storage system and the host computer, and wherein the second storage system is coupled to the host computer without the first storage system being interposed between the second storage system and the host computer, the first and second storage systems each including a command-function correspondence table having first correspondence information regarding correspondence relationships between commands from the host computer and functions of the first and the second storage systems and a function-device correspondence table having second correspondence information regarding correspondence relationships between the functions and the storage systems that have the functions, wherein the third storage system is coupled to the first storage system and the second storage system and comprises a real storage system for the first and second storage systems, wherein one of the first and the second storage systems is configured to provide a logical volume of the third storage system as a virtual volume to the host computer, wherein the host computer is configured to recognize the first and the second storage systems logically as a single virtual storage system, and wherein one of the first and the second storage systems is configured to:

receive a command from the host computer to the virtual storage system;

determine which of the storage systems possesses the function corresponding to the command by referring to the first and second correspondence information;

if said one of the first and the second storage systems has possession of the function, execute the command; and if said one of the first and the second storage systems does not have possession of the function, transfer the command to the other one of the first and the second storage systems in possession of the function corresponding to the command by referring to the second correspondence information.

2. The computer system according to claim 1, wherein each of the first and second storage systems further comprises a command device, wherein each of the command devices is written with the command and is configured to execute the retrieving and the transferring.

3. The computer system according to claim 2, wherein, if either of the first and second storage systems does not have possession of the function, the first and second storage systems are configured to request a re-issue of the command whose destination is one of the first and second storage systems which has the possession of the function.

4. The computer system according to claim 3, wherein, if one of the first and second storage systems receives an indication of error from the other one of the first and second storage systems after transferring the command, said one of the first and second storage systems is configured to determine the other one of the first and second storage systems, except the storage system which issued the error, in possession of the function corresponding to the command by referring to the second correspondence information and to transfer the command to the other one of the first and second storage systems.

5. A computer system coupled to a host computer and a management server, the computer system comprising first, second and third storage systems which are each separate from and do not include the management server or the host computer, wherein the first storage system and the second storage system are each coupled to the host computer and each comprise a virtual storage system for the host computer, wherein the first storage system is coupled to the host computer without the second storage system being interposed between the first storage system and the host computer, and wherein the second storage system is coupled to the host computer without the first storage system being interposed between the second storage system and the host computer, the first and second storage systems, further comprising a virtualization device for virtualizing the first and second storage systems into a single storage resource provided to the host computer, each of the first and second storage systems including a command-function correspondence table having first correspondence information regarding correspondence relationships between commands from the host computer and functions of the first and the second storage systems and a function-device correspondence table having second correspondence information regarding correspondence relationships between the functions and the storage system that have the functions, wherein the virtualization device is coupled to the first and second storage systems and the host computer, wherein the third storage system is coupled to the first storage system and the second storage system and comprises a real storage system for the first and second storage systems, wherein one of the first and the second storage system is configured to provide a logical volume stored in the third storage system as a virtual volume to the host computer, wherein the host computer is configured to recognize the first and the second storage systems logically as a single virtual storage device, wherein the virtualization device is configured to:

receive a command from the host computer to the virtual storage device;

determine which of the storage systems possesses the function corresponding to a command by referring to the first and second correspondence information; and transfer the command to one of the first and the second storage systems in possession of the function corresponding to the command by referring to the second correspondence information.

6. The computer system according to claim 5, wherein each of the first and second storage systems further comprises a command device, wherein each of the command devices is written with the command from the host computer, and wherein each of the command devices includes the first correspondence information and the second correspondence information, and is configured to:

retrieve possession of the function corresponding to the command by referring to the first correspondence information and, if one of the first and second storage systems which comprises one of the command devices written with the command does not have possession of the function, to transfer the command to the other one of the first and second storage systems in possession of the function corresponding to the command by referring to the second correspondence information.

7. The computer system according to claim 5, wherein, if either of the first and second storage systems does not have possession of the function, the first and second storage systems are configured to requests a re-issue of the command whose destination is one of the first and second storage systems which has possession in the function.

8. The computer system according to claim 7,
wherein, if one of the first and second storage systems receives an indication of error from the other one of the first and second storage system after transferring the command, said one of the first and second storage systems is configured to determine the other one of the first and second storage systems, except the storage system which issued the error, in possession of the function corresponding to the command by referring to the second correspondence information and to transfer the command to the other one of the first and second storage systems.

9. The computer system according to claim 1, wherein one of the first and the second storage systems is configured to transfer data to be used in a process of the command to the other one of the first and the second storage systems.

10. The computer system according to claim 9, wherein one of the first and the second storage systems is configured to transfer the data to be used in a process of the command with the command.

11. The computer system according to claim 5, wherein one of the first and the second storage systems is configured to transfer data to be used in a process of the command to the other one of the first and the second storage systems.

12. The computer system according to claim 11, wherein one of the first and the second storage systems is configured to transfer the data to be used in a process of the command with the command.

13. A computer system coupled to a host computer and a management server, the computer system comprising first, second and third storage systems which are each separate from and do not include the management server or the host computer,
wherein the first storage system and the second storage system are each coupled to the host computer,
wherein the first storage system is coupled to the host computer without the second storage system being interposed between the first storage system and the host computer,
wherein the second storage system is coupled to the host computer without the first storage system being interposed between the second storage system and the host computer, the first and the second storage systems each having:
first correspondence information regarding a correspondence relationship between a command from the host computer and a function of the first and the second storage systems; and
second correspondence information regarding a correspondence relationship between the function and the storage systems that have the function;
wherein the third storage system is coupled to the first storage system and the second storage system,
wherein one of the first and the second storage systems is configured to provide a logical volume of the third storage system as a virtual volume to the host computer,
wherein the host computer is configured to recognize the first and the second storage systems logically as a single virtual storage system,
wherein one of the first and the second storage systems is configured to:
receive the command from the host computer to the virtual storage system;
determine which of the storage systems possesses the function corresponding to the command by referring to the first and the second correspondence information;
if the one of the first and the second storage systems has the possession of the function, execute the command; and
if the one of the first and the second storage systems does not have the possession of the function, transfer the command to other one of the first and the second storage systems in possession of the function corresponding to the command by referring to the second correspondence information.

14. The computer system according to claim 13,
wherein each of the first and the second storage systems further comprises a command device,
wherein each command device is written with the command from the host computer and is configured to execute retrieving and the transferring.

15. The computer system according to claim 14,
wherein, if either of the first storage system or the second storage system does not have the possession of the function, the first and the second storage systems are configured to request a re-issue of the command whose destination is one of the first and the second storage systems which has the possession of the function.

16. The computer system according to claim 15,
wherein, if the one of the first and the second storage systems receives an indication of error from the other one of the first and the second storage systems after transferring the command, the one of the first and the second storage systems is configured to:
determine the other one of the first and the second storage systems, except the storage system which issued the error, in possession of the function corresponding to the command by referring to the second correspondence information; and
transfer the command to the other one of the first and the second storage systems.

17. A computer system coupled to a host computer and a management server, the computer system comprising first, second and third storage systems which are each separate from and do not include the management server or the host computer,
wherein the first storage system and the second storage system are each coupled to the host computer,
wherein the first storage system is coupled to the host computer without the second storage system being interposed between the first storage system and the host computer,
wherein the second storage system is coupled to the host computer without the first storage system being interposed between the second storage system and the host computer;
a virtualization device for virtualizing the first and the second storage systems into a single storage resource provided to the host computer, each of the first and the second storage systems each having first correspondence information regarding a correspondence relationship between a command from the host computer and a function of the first and the second storage systems; and
second correspondence information regarding a correspondence relationship between the function and the storage systems that have the functions,
wherein the virtualization device is coupled to the first and the second storage systems and the host computer;
wherein the third storage system is coupled to the first storage system and the second storage system,
wherein one of the first and the second storage systems is configured to provide a logical volume stored in the third storage system as a virtual volume to the host computer, wherein the host computer is configured to recognize the first and the second storage systems logically as a single virtual storage system, wherein the virtualization device is configured to:

receive the command from the host computer to the virtual storage system;

determine which of the storage systems possesses the function corresponding to the command by referring to the first and the second correspondence information; and transfer the command to the one of the first and the second storage systems in possession of the function corresponding to the command by referring to the second correspondence information.

18. The computer system according to claim 17, wherein each of the first and the second storage systems further comprises a command device, wherein each command device is written with the command from the host computer, wherein the each command device includes the first correspondence information and the second correspondence information, and is configured to:

retrieve the possession of the function corresponding to the command by referring to the first correspondence information and, if the one of the first and the second storage systems which comprises one of the command devices written with the command does not have the possession of the function, transfer the command to other one of the first and the second storage systems in possession of the function corresponding to the command by referring to the second correspondence information.

19. The computer system according to claim 17, wherein, if either of the first storage system or the second storage system does not have the possession of the function, the first and the second storage systems are configured to request a re-issue of the command whose destination is the one of the first and the second storage systems which has the possession of the function.

20. The computer system according to claim 19, wherein, if the one of the first and the second storage systems receives an indication of error from the other one of the first and the second storage systems after transferring the command, the one of the first and the second storage systems is configured to:

determine the other one of the first and the second storage systems, except the storage system which issued the error, in possession of the function corresponding to the command by referring to the second correspondence information; and transfer the command to the other one of the first and the second storage systems.

\* \* \* \* \*